(12) United States Patent
Maynard et al.

(10) Patent No.: US 7,682,122 B2
(45) Date of Patent: *Mar. 23, 2010

(54) ARTICLE RETRIEVING AND POSITIONING SYSTEM AND APPARATUS FOR ARTICLES, LAYERS, CASES, AND PALLETS

(76) Inventors: Michael D. Maynard, 261 Preston Estate, Paintsville, KY (US) 41240;
Richard C. Young, 3631 Patty Ct., Bonita Springs, FL (US) 34134-7573;
Ronald E. Ward, 2463 Pidgeonroost Rd., Paintsville, KY (US) 41240

( * ) Notice: Subject to any disclaimer, the term of this patent is extended or adjusted under 35 U.S.C. 154(b) by 1006 days.

This patent is subject to a terminal disclaimer.

(21) Appl. No.: 11/095,021

(22) Filed: Mar. 31, 2005

(65) Prior Publication Data

US 2005/0281641 A1  Dec. 22, 2005

Related U.S. Application Data

(63) Continuation-in-part of application No. 10/895,031, filed on Jul. 20, 2004, now abandoned, which is a continuation-in-part of application No. 09/902,477, filed on Jul. 10, 2001, now Pat. No. 6,764,266, which is a continuation-in-part of application No. 09/363,622, filed on Jul. 29, 1999, now Pat. No. 6,257,821, which is a continuation-in-part of application No. 08/898,073, filed on Jul. 22, 1997, now Pat. No. 6,234,737.

(60) Provisional application No. 60/588,356, filed on Mar. 31, 2004, provisional application No. 60/558,362, filed on Mar. 31, 2004.

(51) Int. Cl.
*B65G 54/06* (2006.01)

(52) U.S. Cl. .................................................. 414/276
(58) Field of Classification Search ................. 414/277, 414/280, 282, 276; 901/16
See application file for complete search history.

(56) References Cited

U.S. PATENT DOCUMENTS

| 3,674,159 | A | | 7/1972 | Lemelson |
| 3,735,231 | A | | 5/1973 | Sawyer |
| 3,854,604 | A | * | 12/1974 | Peterson et al. ............. 414/277 |
| 4,307,988 | A | | 12/1981 | Page et al. |

(Continued)

*Primary Examiner*—Charles A Fox
(74) *Attorney, Agent, or Firm*—Carrithers Law Office, PLLC; David W. Carrithers

(57) ABSTRACT

A warehousing system and apparatus for retrieving articles from a preselected storage area containing a quantity of the same and delivering them to a designated area spaced therefrom. A track extends a selected distance along a predetermined path that is offset a selected distance from the stored articles. A motorized carriage is rollingly mounted on the track and has a load carrying support surface thereon on which a payload is accumulated one article after another during the building of such load. A rigid superstructure is carried by the carriage and an extendible and retractable reach is mounted on thereon. A power operated article gripping assembly is carried by the reach for grasping articles one at a time in the storage area and loading them in sequence onto the carriage for delivery to the designated area. The apparatus is controlled from a location spaced from the storage area and inter-relates and controls movement of the carriage along said track, extension and retraction of the reach, and operation of the article gripping assembly to retrieve articles.

12 Claims, 20 Drawing Sheets

U.S. PATENT DOCUMENTS

| | | | |
|---|---|---|---|
| 4,616,414 A * | 10/1986 | Cushman | 29/835 |
| 4,678,390 A * | 7/1987 | Bonneton et al. | 414/282 |
| 4,758,750 A | 7/1988 | Itagaki et al. | |
| 4,800,818 A | 1/1989 | Kawaguchi et al. | |
| 4,805,761 A | 2/1989 | Totsch | |
| 4,824,311 A * | 4/1989 | Mims | 414/273 |
| 4,844,679 A | 7/1989 | Teranishi | |
| 5,158,021 A | 10/1992 | Matsui et al. | |
| 5,201,397 A | 4/1993 | Isaacs | |
| 5,234,303 A | 8/1993 | Koyano | |
| 5,277,125 A | 1/1994 | DiFonso et al. | |
| 5,328,316 A * | 7/1994 | Hoffmann | 414/280 |
| 5,346,351 A * | 9/1994 | Priolo et al. | 414/277 |
| 5,380,139 A * | 1/1995 | Pohjonen et al. | 414/280 |
| 5,422,821 A | 6/1995 | Allen et al. | |
| 5,551,350 A | 9/1996 | Yamada et al. | |
| 5,562,195 A | 10/1996 | Isaacs | |
| 5,570,990 A | 11/1996 | Bonora et al. | |
| 5,582,324 A | 12/1996 | Pippin et al. | |
| 5,634,562 A | 6/1997 | Isaacs | |
| 5,833,076 A | 11/1998 | Harres et al. | |
| 5,841,950 A | 11/1998 | Wang et al. | |
| 5,868,541 A | 2/1999 | Tajima et al. | |
| 5,927,926 A * | 7/1999 | Yagi et al. | 414/280 |
| 6,206,176 B1 | 3/2001 | Blonigan et al. | |
| 6,234,737 B1 * | 5/2001 | Young et al. | 414/277 |
| 6,257,821 B1 * | 7/2001 | Ward et al. | 414/276 |
| 6,764,266 B2 * | 7/2004 | Young et al. | 414/276 |
| 6,824,345 B2 * | 11/2004 | Hansra et al. | 414/282 |
| 6,923,612 B2 * | 8/2005 | Hansl | 414/277 |
| 7,057,848 B2 * | 6/2006 | Ostwald et al. | 360/92.1 |

* cited by examiner

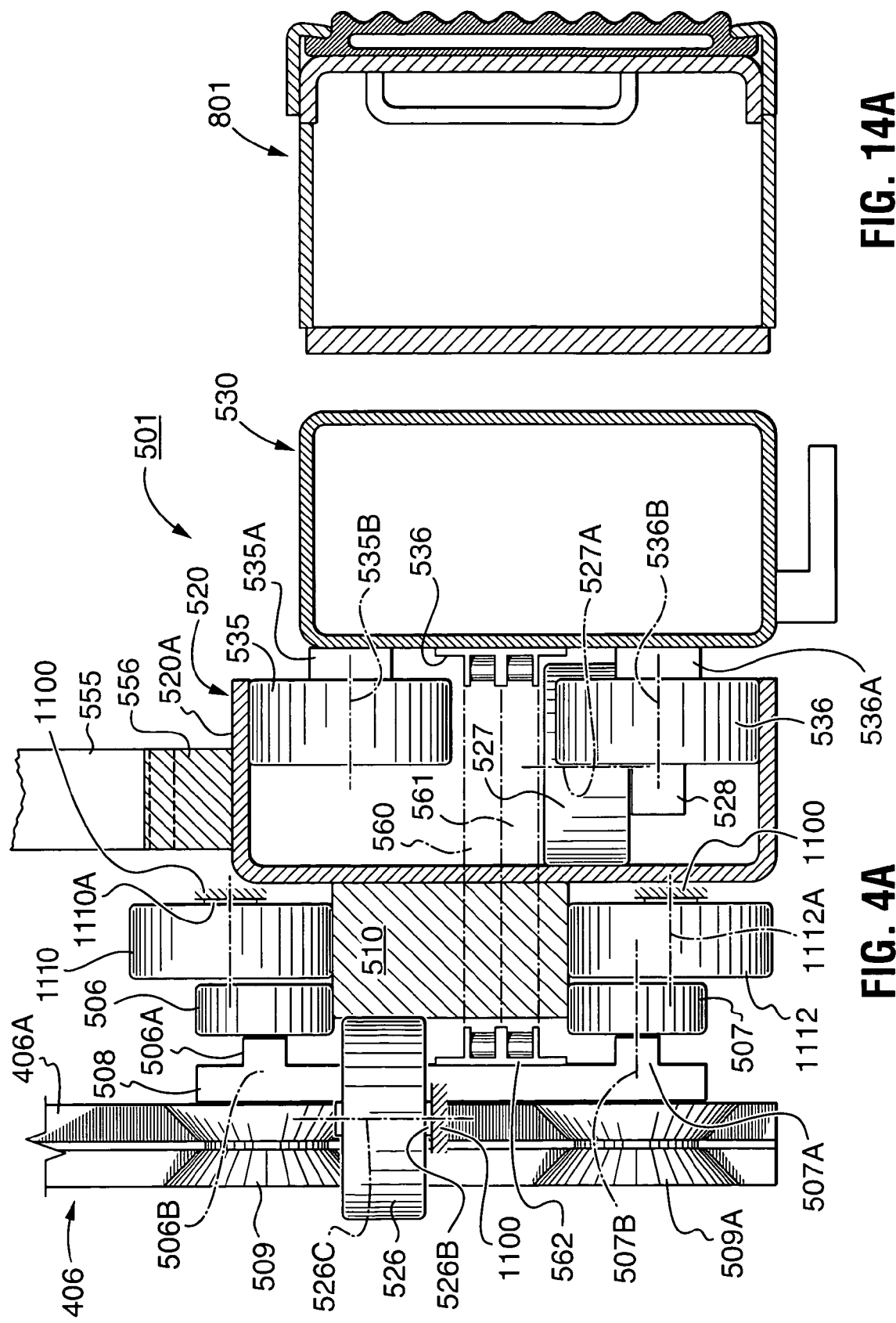

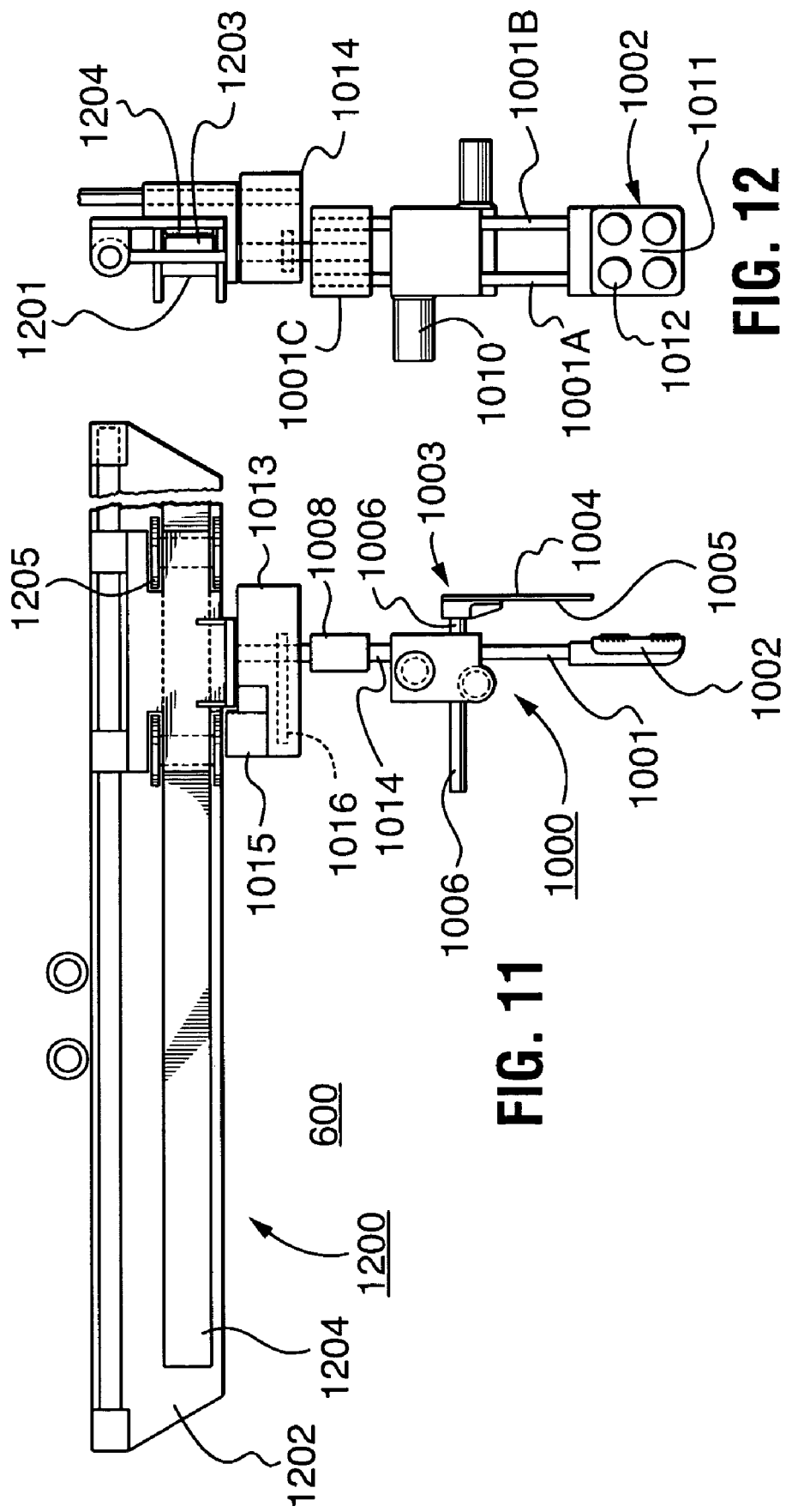

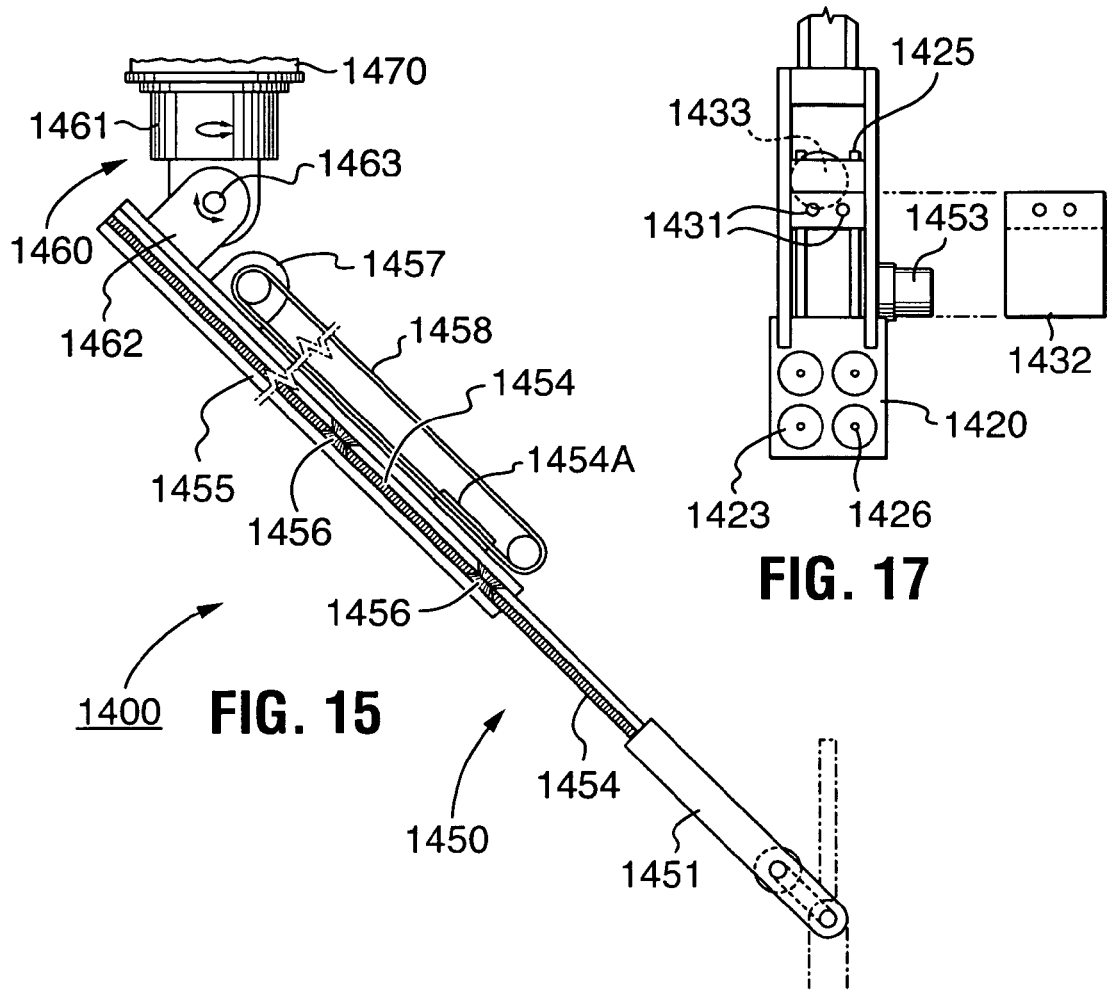
FIG. 15  FIG. 17
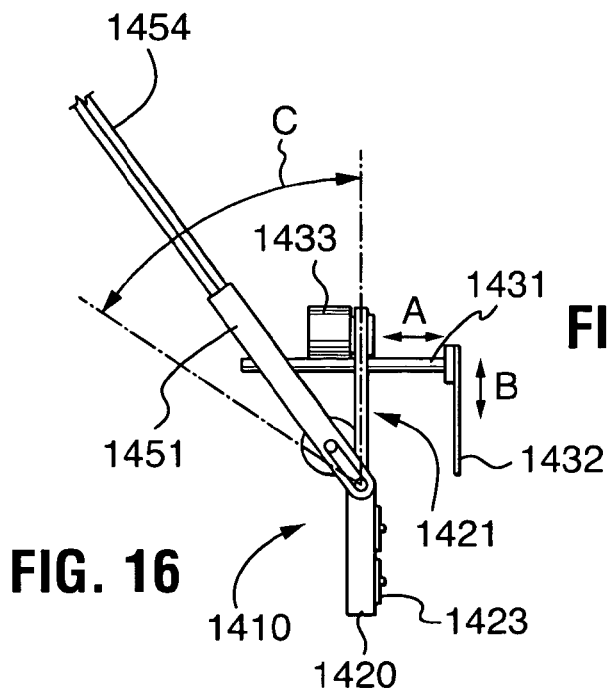
FIG. 16
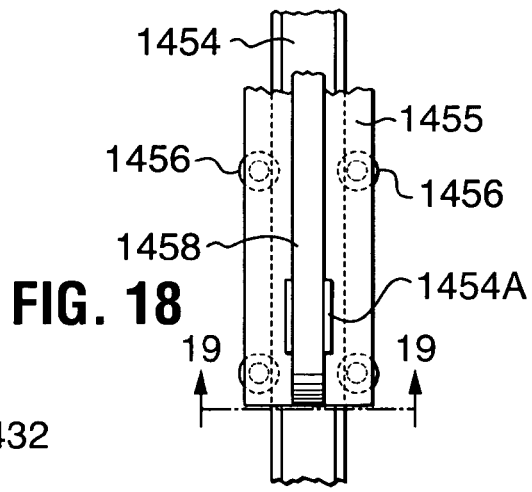
FIG. 18
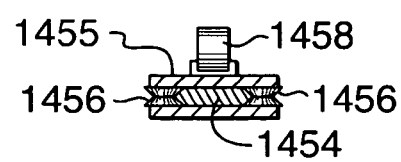
FIG. 19

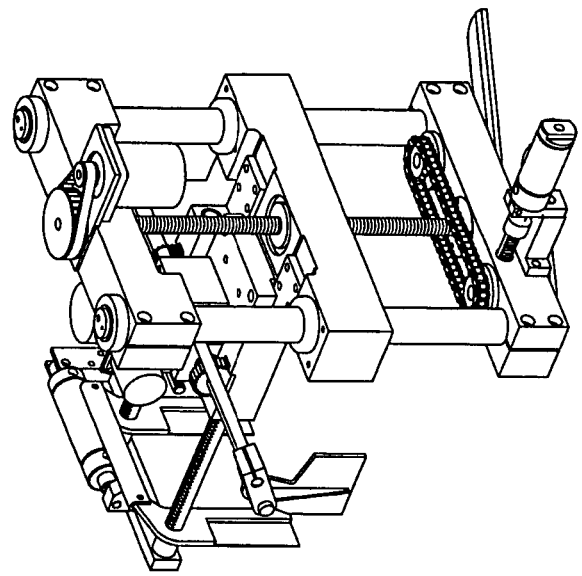
FIG. 31
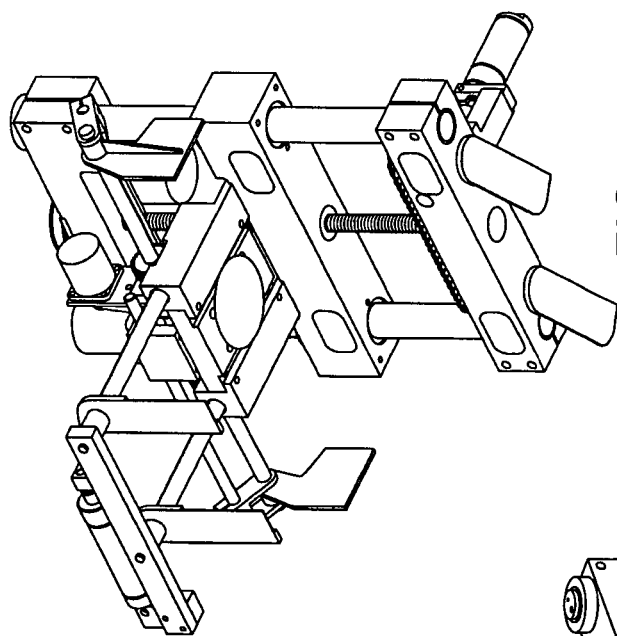
FIG. 30
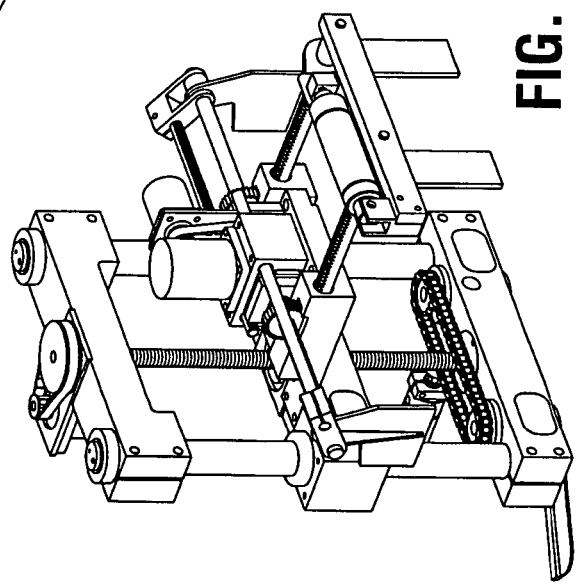
FIG. 29

ARTICLE RETRIEVING AND POSITIONING SYSTEM AND APPARATUS FOR ARTICLES, LAYERS, CASES, AND PALLETS

RELATED APPLICATIONS

This application and claims priority from Provisional application Ser. No. 60/558,356 filed on Mar. 31, 2004 and Ser. No. 60/558,362 filed on Mar. 31, 2004, and is a Continuation-In-Part of Ser. No. 10/895,031 filed on Jul. 20, 2004 now abandoned, which is a Continuation-In-Part of U.S. Pat. No. 6,764,266 which issued on Jul. 20, 2004 from application Ser. No. 09/902,477 filed on Jul. 10, 2001, which is a Continuation-In-Part of U.S. Pat. No. 6,257,821 which issued on Jul. 10, 2001 from application Ser. No. 09/363,622 filed on Jul. 29, 1999, which is a Continuation-In-Part of U.S. Pat. No. 6,234,737 which issued on May 22, 2001 from application Ser. No. 08/898,073 filed on Jul. 22, 1997, all of which are hereby incorporated by reference.

TECHNICAL FIELD OF THE INVENTION

The invention relates to components of a system and a combination and sub-combination of such components to mechanically retrieve one or more items from a preselected area in which a quantity of such items are stored

BACKGROUND OF THE INVENTION

Moreover, conventionally an order for goods is received by a supplier of the same and the goods for that order are picked by hand from a warehouse containing the goods and those hand picked items are packaged and sent out to the party that had requested the same.

By way of example a store may order cases of various different soft drinks for resale in their store. At the warehouse there are cases stacked one on top another and in side by side relation of one specific soft drink and in another stack, or stacks, another variety and so on dependent on the number of different varieties carried by that warehouse. When an order is received at the warehouse one or more individuals set about hand picking the cases of goods to fill the order and take them to a dispatch area. The task is labor intensive, expensive and time consuming.

There is disclosed in U.S. Pat. Nos. 6,257,821, 6,764,266, and 6,234,737 entitled "Robotic Container Handler Systems" a rail and carriage system utilizing linear magnetic motors to controllably propel a carriage along a track consisting of a pair of parallel spaced apart rails.

The present invention is directed to improvements in the construction of the carriage, and to the rails and to a rail and carriage portion of an article handling system intended primarily for improving warehousing of goods by mechanizing handling of the goods being warehoused and/or removed from the warehouse at high speeds and extreme accuracy.

The present invention is efficient in sorting, stacking, and conveying goods in an automated high speed system capable of sorting and moving articles in a few seconds. The present invention eliminates the necessary of persons to work in close proximity to the high speed operating equipment thereby eliminating the hazards associated therewith and the strenuous physical activities associated with sorting and moving the articles and/or containers from the sorting apparatus to the distribution point.

SUMMARY OF THE INVENTION

An object is to provide a carriage for the intended purpose which is simple end easily manufactured.

A further object of the present invention is to provide at least one rail which holds the carriage wheels captive and thereby reduce the likelihood of the carriage tipping or being derailed when subjected to tipping forces for example by over reaching and/or overloading a loading crane mounted on the carriage.

A further object is to provide an improved load hauling carriage and rail system.

It is an object of the present invention to provide a carrier to interface with an article, a container, a tray, a pallet, or a layer that includes onboard lock-up means that retains the payload as the carrier is used for transportation.

It is an object of the present invention to provide a means for loading an article or payload containing goods, transport it to a position determined by an overall system controlling computer and unload the tray containing goods at a selected location at a selected time.

It is an object of the present invention to provide a carrier platform for supporting a robot, wherein said carrier platform base I powered by linear servo magnetic motors providing a very high acceleration and deceleration and the ability to park the entire system consistently within 0.010 inches of a preselected position.

It is an object of the present invention to provide a robot powered by a linear magnetic motor which is cooperatively magnetically engageable with a master rail having a plurality of permanent magnets affixed thereto together with nonferrous guide rollers which maintain a necessary selected gap of about 0.020 of an inch between the motor and rail magnets in order to drive the unit back and forth in the X-axis with high speed and precision.

It is an object of the present invention for the linear motor and magnetic rail system to be adaptable with the carrier platform for moving same over flat surfaces such as a floor with the aid of a second minor rail or balancing rail and for the entire track and carrier platform to be suspended above the ground.

A further object is to provide an improved load hauling carriage and rail system which can be mounted on a floor, overhead, vertically, horizontally, and can move along a straight or curved track at high speeds and stop with extreme accuracy.

An object of the present invention is to mechanize the above described hand operation of retrieving one or more cases of a goods from a storage area containing a quantity of such goods.

A further object of the present invention is to provide a specific apparatus for picking up an article from a quantity of the same and moving it to a selected location for further handling.

An object of the present invention is to provide apparatus for use in mechanizing the above described hand operation of retrieving one or more articles, or cases of articles, from a storage area containing a quantity of the same.

A principal object of the present invention is to provide and system and apparatus in which a payload is carried onboard a movable carriage as the load is being built thereon by retrieving either an article or layer of the same at a time from various locations in a selected storage area.

A further object of the present invention is to provide a system as in the foregoing wherein the payload is built on a pallet carried onboard the carriage.

A further object of the present invention is to provide a specific apparatus for picking up an article from a quantity of the same and moving it to a selected location for further handling.

A further object of the present invention is to provide an apparatus that has a variable in size peripheral frame capable of circumscribing a stack of goods and controllably reduceable in size to grasp and move a selected quantity of such goods from a selected storage area of the same.

In keeping with the foregoing objects there is specifically provided in accordance with the present invention a system and apparatus for retrieving articles from a preselected area containing a quantity of the same and delivering them to a designated area spaced from said storage area, said system and comprising:

(A) a storage area for holding a selected quantity of the articles from which they are retrieved, said articles being stacked one upon another in one or more stacks and being accessible from one side of said storage area;

(B) a track extending a selected distance along a predetermined path that is offset a selected distance from said one side;

(C) a carriage rollingly mounted on said track and being movable there along back and forth in a horizontal direction designated x-x, said carriage having a load carrying support surface thereon on which a payload is accumulated one after another during the building of such load and power means to propel the carriage along said track (D) a rigid superstructure carried by said carriage;

(E) an extendible and retractable reach unit movable in a horizontal direction designated y-y disposed generally perpendicular to said x-x direction, means mounting said reach unit on said rigid support structure for moving an article gripping unit up and down in a vertical direction designated z-z, and power means to extend and retract said reach unit and move the reach unit up and down;

(F) a power operated article gripping assembly carried by said reach assembly for grasping an article to be retrieve from said storage area; and (G) means to inter-relate and control movement of the carriage along said track, extension and retraction of the reach unit, and operation of the article gripping assembly to retrieve articles one after another from said storage area and place the same on the carriage for delivery to the designated area.

There is particularly provided in accordance with the present invention apparatus for retrieving articles from various different locations in a preselected area with a quantity of such articles therein and delivering the same to a designated area spaced from said preselected area, said apparatus comprising:

(A) a carriage rollingly mountable on a track system having a predetermined path offset a selected distance along said preselected area for the articles, said carriage having a load carrying support surface thereon for holding articles as they are retrieved in succession one after another from said preselected area and first power means on said carriage to propel the same along said track (B) a rigid support superstructure carried by said carriage;

(C) reach means mounted on said superstructure and second power means to extend and retract the same; and (D) a power operated article gripping assembly carried by said reach means for grasping an article to be retrieved from said preselected area and place it on said carriage load carrying surface.

In accordance with a further aspect of the present invention there is provided an article gripping assembly comprising a base assembly; a first elongate member mounted said base assembly, said elongate member extending in a first direction and terminating in a first jaw member on a free outer end thereof, said jaw member having an article engaging face thereon; a second elongate member movably mounted on said first elongate member for movement longitudinally there along in a direction toward and away from said first jaw member, said first and second elongate members being angularly related with respect to one another, a second jaw member mounted on said second elongate member and being moveable in a direction toward and away from said first elongate member and power means for moving said second jaw member.

In accordance with a still further aspect of the present invention there is provided apparatus for retrieving articles from a stack of the same in a selected storage area and load the same onto a mobile carriage means, said apparatus comprising:

(A) a support structure;

(B) an extendable and retractable boom;

(C) means mounting said boom, adjacent one end thereof, on said support structure;

(D) a work head tool; and (E) means mounting said work head tool on a free outer end of said boom opposite to said one end, said work head tool comprising a yoke attached to said boom and extending from said free outer end thereof, a first jaw member pivotally attached to said yoke, a first elongate member secured to and extending from said first jaw member, a second elongate member movably mounted on said first elongate member for movement longitudinally therealong a second jaw member mounted on said first elongate member and being reciprocal movable in directions toward and away from said first elongate member, said second jaw member having an article engaging face positionable in face to face relation with said first jaw member.

Moreover, the invention can be utilized with a moving platform comprises a carriage that is rollingly supported by a plurality of rollers on the rails together with an upper plate that is rectangular in plan view and of selected dimensions suitable for the task at hand. A package transfer apparatus such as a plurality of side-by-side parallel rollers can be mounted on the carriage and disposed above the plate for loading and unloading articles onto and off the carriage. The rollers are power driven and reversible so as to move goods thereon in one direction or the other.

A rigid support structure is carried by the platform. A reach unit is movably mounted for movement up and down on the rigid structure by a reach unit mounting structure. The reach unit includes power means to extend the same a selected distance beyond at least one side(preferably both sides) of the support structure and a further power means raises and lowers the reach unit mounting structure on the rigid support structure.

A pair of telescopic members can be slidably mounted on the reach unit to extend beyond one side or the other of opposite sides of the rigid support structure wherein it is extendable a selected amount beyond each of the opposite sides of the support structure.

In accordance with one aspect of the present invention there is provided a linear motor rail transfer vehicle comprising a rigid elongate rail having a mounting flange, a web and a further flange together providing a rail having respective first and second opposite side faces the flanges and web defining an open faced channel along the first side face of the rail. An elongate magnet mounting strip of material secured to the rail and extends along the second side face. A carriage comprising a motor mounting subassembly is movably mounted on the rail. The motor mounting subassembly includes an elongate rigid beam having a open faced channel receiving therein a portion of the rail that projects from the surface of a support structure on which the rail is mounted. A first plurality of spaced apart rollers is journalled on the rigid beam. The first plurality of rollers are disposed in the open faced channel in the first side face of the rail. A second plurality of spaced apart rollers are journalled on the carriage and roll reacting against the second side face of the rail. A third plurality of rollers are journalled on the carriage and rollingly react against the first side of the rail. The rollers rollingly supporting the carriage on the rail and guide the same there along. Magnets are secured to the magnet mounting strip and extend in a strip therealong at selected internals at the second side of the rail. At least one linear motor is mounted on the beam and disposed in the channel therein in face-to face relation with the magnets on the magnet mounting strip. The second plurality of rollers define a selected minimum air gap between the strip of magnets on the rail and an adjacently disposed face of the motor.

In accordance with a further aspect of the present invention, there is provided a rail carriage rollingly mountable on a track comprising a pair of laterally spaced apart parallel rails. The carriage comprises a load carrying structural frame having rollers journalled thereon that rollingly engage and thereby support the carriage on the pair of rails. The frame has a pair of oppositely disposed marginal edges, and a longitudinally extending motor mounting subassembly is carried by the structural frame providing a downwardly facing channel disposed to receive therein a portion of one of the pair of rails on which the carriage is rollingly supported. A linear motor is mounted on the subassembly and located in the downwardly facing channel at a position in face-to face relation with a side face of a rail on which there is mounted thereon a strip of magnets.

There is also provided in accordance with the present invention a track and carriage system comprising a pair of laterally spaced apart parallel rails and a carriage rollingly mounted on the rails. The carriage comprises a load carrying structural frame having rollers journalled thereon rollingly engaging and thereby supporting the carriage on the pair of rails. The structural frame has a pair of oppositely disposed marginal edges, and a longitudinally extending motor mounting subassembly on the structural frame and providing a downwardly facing channel receiving therein a portion of one of the pair of rails. A linear motor is mounted on the subassembly and located in the downwardly facing channel at a position in face-to face relation with a side face of the rail. A strip of magnets is mounted to the rail side face and means are included to maintain a selected air gap between the linear motor and the strip of magnets.

The load carrying structural frame maybe a plurality of elongate beams disposed side-by-side and interconnected to provide a rigid assembly or a cast member or at least one and preferably a plurality of interconnected cast members. The support rollers can be journalled on the load carrying structural frame but preferably are located on respective ones of a pair of side rails located on respective ones of the oppositely disposed longitudinal marginal edges of the rigid frame.

Moreover, the present invention also defines a robotic parts handling system having a carrier forming a platform base including at least one linear servo magnetic motor affixed to and extending along the side beneath the platform. The platform is supported by a track including a first master rail including magnets affixed thereto. One or more minor balancing rails may be incorporated therewith for additional support of the carrier platform. A plurality of supporting rollers supporting and hold the platform to the first master rail and the second minor balancing rail. A plurality of magnets mounted along the length of the first master rail are in cooperative magnetic engagement with the at least one linear servo magnetic motor. A plurality of positioning rollers mounted to the platform maintain a constant distance between the linear servo magnetic motor and the magnets mounted to the first master rail. A computer control unit controls and coordinates movement of the carrier platform along the rails and the operation of the robotic end effector means for picking and gripping objects. A magnetic strip provides a means in close proximity to the rail for generating pulses readable by a reader in communication with the control unit for positioning the platform at selected positions upon the rail.

The present invention defines a high speed robotic container handling system having a digital magnetic positioning system, a platform frame having a linear servo motor thereon moveable along at least one rail which includes magnets affixed thereto.

In one embodiment the rail vehicle comprises only one frame side rail and the motor mount subassembly and wherein they are interconnected to provide a rigid unit that is rollingly mounted on a single rail.

Of course, other means for positioning the carrier in relationship to the rail such as an optical encoder or inferometer can be used instead of or in addition to the magnetic encoder.

Other objects, features, and advantages of the invention will be apparent with the following detailed description taken in conjunction with the accompanying drawings showing a preferred embodiment of the invention.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 4A is a partial sectional view taken essentially along line 4A-4A of FIG. 2

FIG. 11 is an Elevational view of the case picker tool unit of FIG. 8 depending from a supporting rail structure;

FIG. 12 is a right hand side view of FIG. 11;

FIG. 14A is a sectional view taken essentially along line 14A-14A of FIG. 14

FIG. 15 is a side elevational view of a boom structure for mounting a tool head on the carriage superstructure;

FIG. 16 is a side elevational view of a tool head similar to that shown in FIGS. 11, 12 but with several modifications and means mounting the same on the extendible boom;

FIG. 17 is a right hand side view of FIG. 16;

FIG. 18 is a partial top plan view of a portion of the length of the telescopic boom shown in FIG. 15;

FIG. 19 is a sectional view taken essentially along line 19A-19A of FIG. 15.

FIG. 29 is an oblique front view of a case picker assembly;

FIG. 30 is an oblique elevated view of the case picker assembly of FIG. 29;

FIG. 31 is an oblique side view of the case picker assembly of FIG. 29;

DETAILED DESCRIPTION OF THE PREFERRED EMBODIMENT

Figure 1:
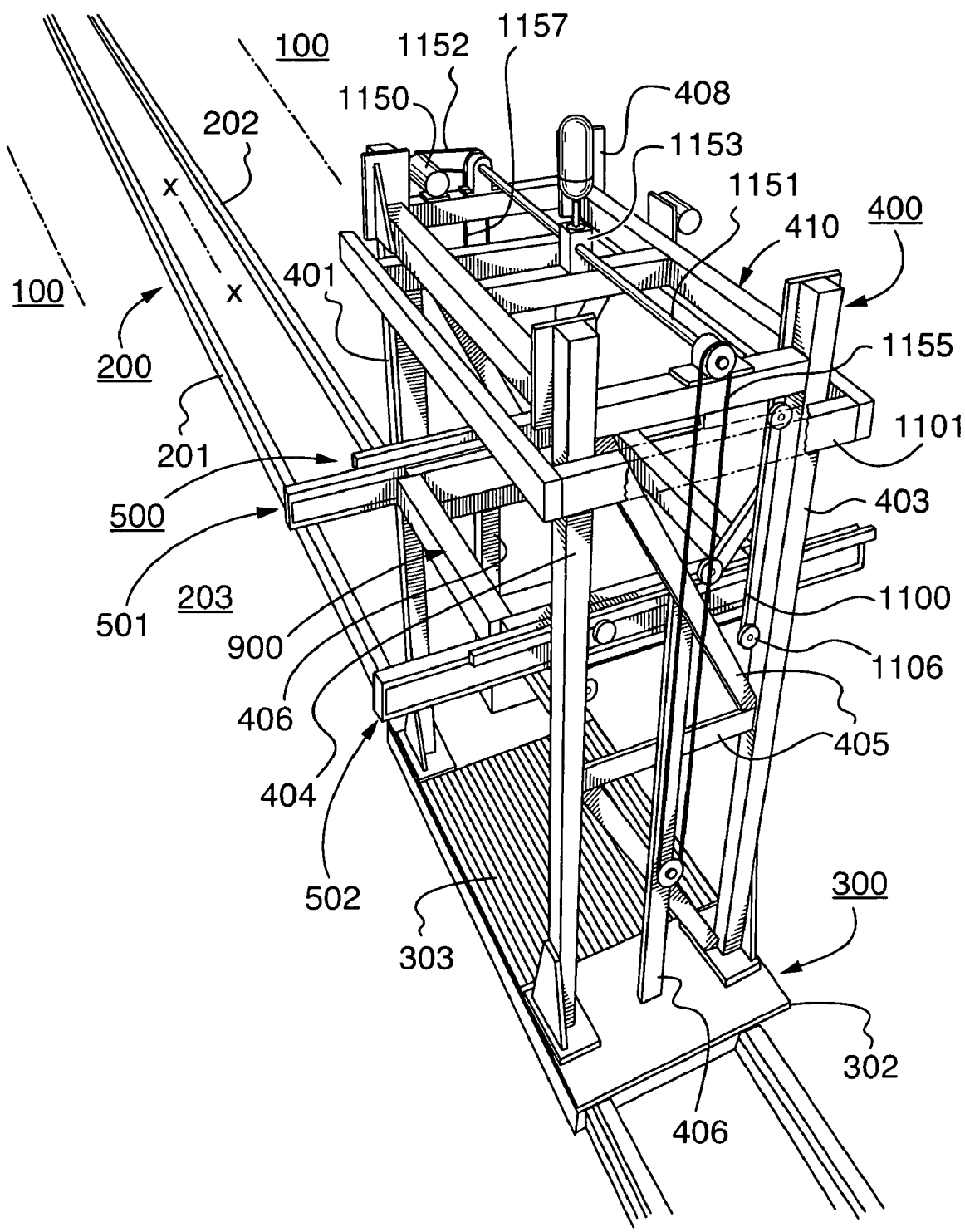
FIG. 1 is a general overall diagrammatic perspective view of a carriage on a track and a reach unit movably mounted on a support structure carried by the carriage.
Figure 2:
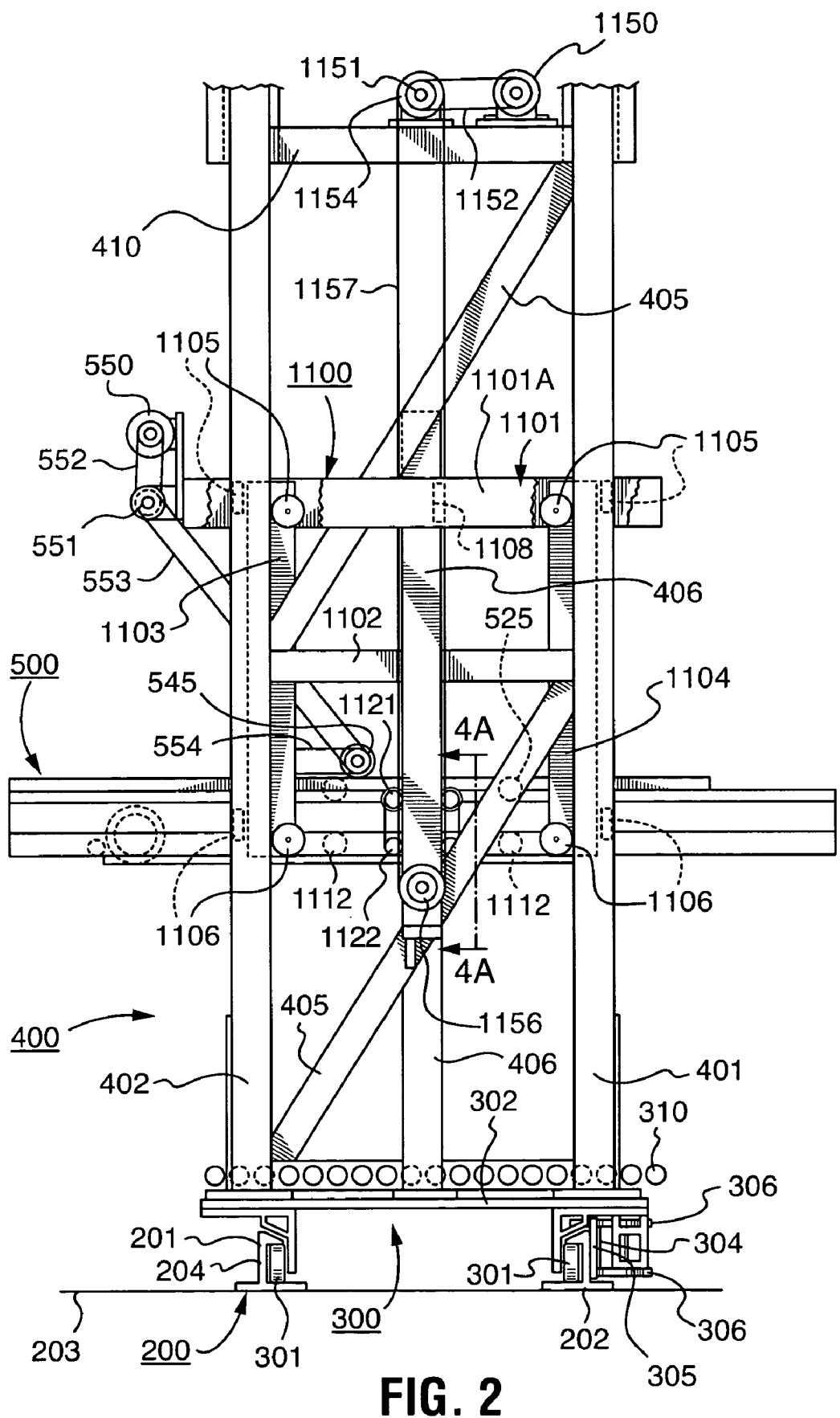
FIG. 2 is an end (opposite to that shown in FIG. 1) elevational view showing details of a rigid open superstructure, a carriage on which the superstructure is supported and a cross-section through a track consisting of a pair of spaced apart rails on which the carriage is rolling guided and supported.
Figure 3:
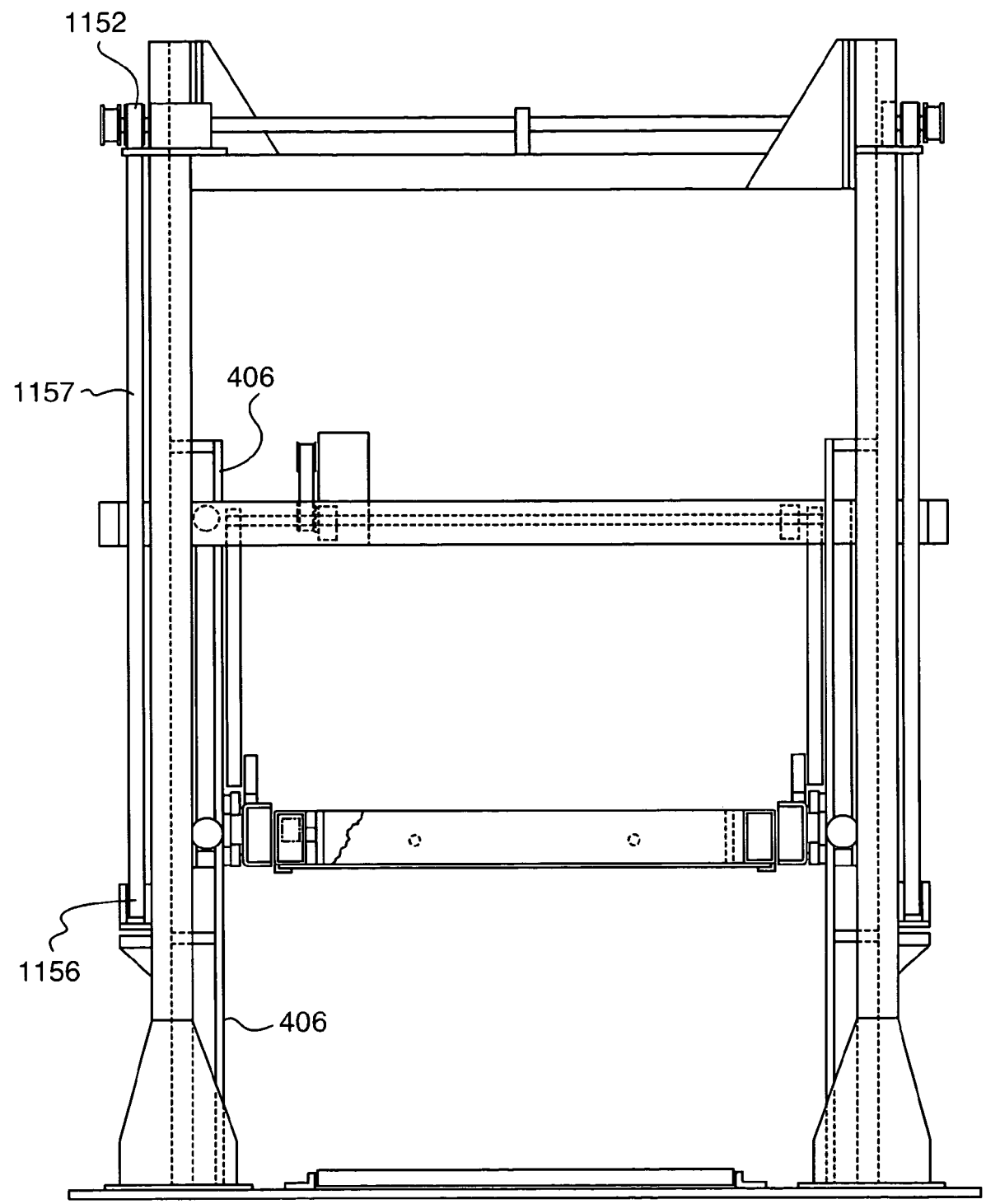
FIG. 3 is right hand side elevational view of FIG. 2.
Figure 4:
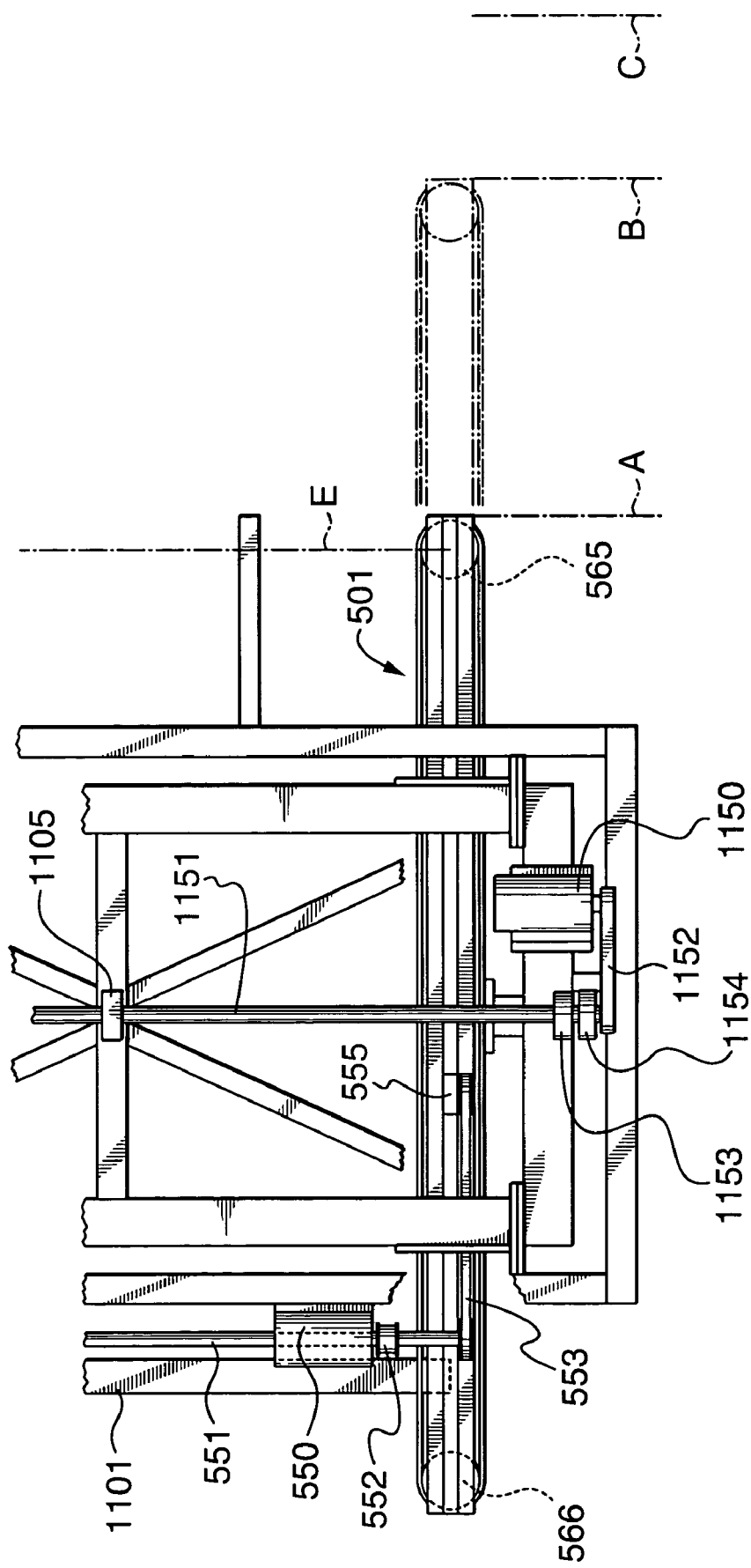
FIG. 4 is a partial top plan view of FIG. 2 illustrating half of the structure with it being understood the other half is essentially the same except for the absence of the drive motor.
Figure 6:
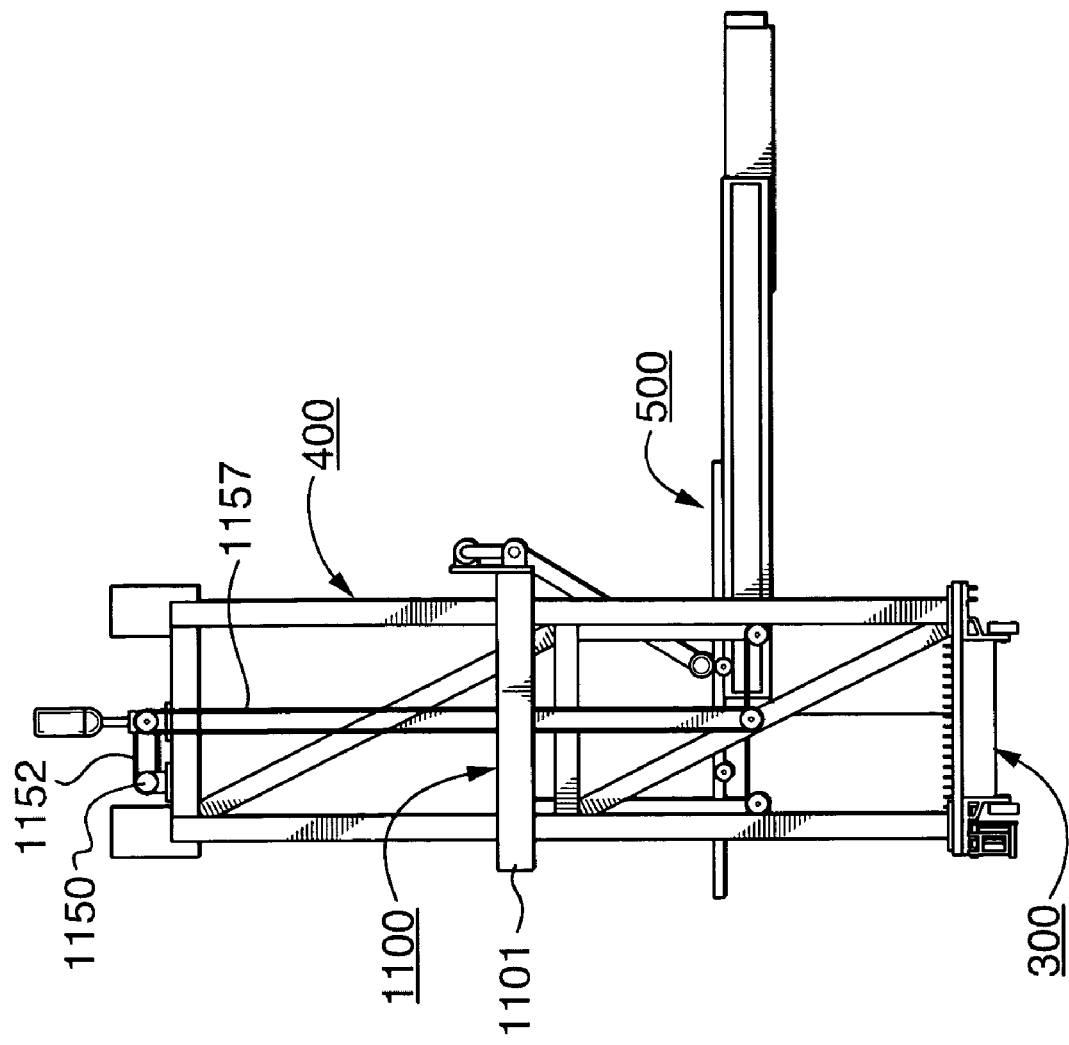
FIG. 6 is a diagrammatic end view of the support structure as in FIG. 5 but with the reach unit in a partial raised position and fully extended to one side of the support structure.

The apparatus will be discussed hereinafter with reference to the following components and inter-relationship of the same for mechanizing the operation of retrieving one or more articles from a designated storage area of the same and in another instance layers of goods from stacks of the same with the tool head in the first instance being often referred to herein as a case picker tool unit and in the other instance a layer picker tool unit. In the first instance the one article may for example be a container filled with goods i.e. a case of soft drinks or tins of goods. In the second instance the layer of goods maybe containers stacked one on top of the other. Broadly the payload may include dunnage (totes/crates for holding items in segregated layers), 55 gallon drums, coil steel, heavy machined parts or fabrications etc.

The invention, as defined in the claims hereinafter, is directed to various components as well as combinations and sub-combinations thereof.

System Components and Generic Series of References Applied to the Same

100 Storage Area
200 Track
300 Carriage
400 Reach Unit Rigid Support Structure (carriage superstructure)
    1100 Vertically moveable Reach Unit Support Structure
500 Reach Unit
600 Power Operated Gripping Assembly
    Layer Picker Tool Unit
        800 Variable in size Peripheral Frame Article Gripper
        900 Peripheral Frame Support Structure and Power Drive System
    Case Picker Tool Unit
        1000 Jaw Type Article Gripper
        1200 Jaw Assembly Mounting Structure
        1400 Modified Jaw Type gripper and Extendible and Retractable boom for mounting the same on the carriage superstructure.
700 Control System System Overview Disclosed herein is a system for retrieving one or more articles from a preselected area containing a quantity of such articles and delivering the same to a preselected designated area spaced from said storage area, said system comprising:

(A) a storage area 100 for holding a selected quantity of the articles from which at least one is to be retrieved, said articles being accessible from one side thereof;

(B) a track 200 extending a selected distance along a predetermined path that is spaced a selected distance from said one side and including a pair of laterally spaced apart rails;

(C) a carriage 300 carried by said track and being rollingly movable there along back and forth in a horizontal direction designated x-x, said carriage having a load carrying support surface thereon on which a payload is built and power means to propel the carriage along said track;

(D) a rigid superstructure 400 carried by said carriage and projecting upwardly therefrom for supporting a reach unit;

(E) a reach unit 500 extendible and retractable in a horizontal direction designated y-y perpendicular to the x-x direction, a reach unit mounting structure 1100 on said rigid support structure permitting moving the reach unit up and down in a vertical direction designated z-z, first power means to extend and retract the reach unit and second power means to move it up and down;

(F) a power operated article gripping assembly 600 (tool head) carried by said reach assembly for grasping an article (or articles) to be retrieve from said storage area. The tool head in one instance is a jaw type assembly 1000 and mounting assembly 1200 that mounts it on the reach unit (collectively providing a case picker) and in another instance the tool head is a variable in size peripheral frame 800 and support 900 therefore that mounts the same on the reach unit (layer picker); and (G) Control means 700 for remotely actuating actuators to inter-relate and control movement of the carriage 300 along said track, extension and retraction and up and down movement of the reach unit 500, and operation of the article gripping assembly 600 to retrieve at least one article from said storage area, place it on the carriage and deliver the retrieved articles to a preselected receiving area.

Case Picker

In the situation where a plurality of cases of goods, e.g. cases of soft drinks, are stacked side-by-side and one on top of another in each of at least one of such stacks the article gripping assembly 600 on the reach unit comprises a jaw assembly 1000 or jaw assembly 1400 that can be opened and closed respectively to receive and grasp an article in the storage area of the same and move the article to the load support surface on said carriage. One jaw member can apply a suction grip on a side face of an article and pull such article away from an adjacent article such as to enable placing the other jaw member between the adjacent articles. The article for example maybe a single article or a container filled with a plurality of articles and considered as a single unit.

Layer Picker

In the situation where a plurality of articles are stacked in layers one upon another the article gripping assembly 600 comprises a tool head that has a variable in size peripheral frame 800 on a rigid supporting frame structure 900 that is carried by the reach unit 500. The peripheral frame is expandible to circumscribe the stack of goods and reduceable in size to grasp one or more articles in the stack. A power drive system is mounted on the frame structure 900 to vary the size of the peripheral frame 800. The peripheral frame and support therefor are carried by the reach unit 500.

Reach Unit 500, Reach Unit Mounting 1100 and Superstructure 400

Referring to FIGS. 1 to 4 there is a track system 200 that includes a pair of elongate rails 201, 202 fixedly secured in horizontal spaced apart relation in a suitable manner to a base i.e. a floor 203. The rails have a channel 204 in a side face thereof and these are in face-to-face relation in the rails 201, 202. The rails follow a predetermined path set a selected distance offset from a storage area 100 in which there are articles to be retrieved. The storage area maybe located on each of opposite sides of the track system and include vertical stacks of goods on pallets disposed side-by-side and in one or more tiers along one or both sides of the predetermined path.

A carriage 300 is rollingly supported by a plurality of rollers 301 running on a lower flange of the rails. The rollers run in the channels 204 in a side face of the rail and are thereby held captive. The carriage has an upper plate 302 that is rectangular in plan view and of selected dimensions suitable for the task at hand. The carriage is propelled along the track by a linear magnetic motor that includes a motor 304 mounted on the carriage and spaced a fixed selected distance from a linear magnetic strip 305 on a side face of the rail 202. One or more motors can be mounted on the carriage in end-to-end relation in a direction longitudinally of the rail dependent upon power requirements to propel a loaded carriage along the track 200. The motor is about 33 inches in length and a single carriage is thus preferably about 36 inches in length. The gap (a few thousandths of an inch) is maintained by a plurality of rollers 306 that are mounted on the carriage for rotation about a vertical axis 307 and in rolling contact with a side face of the rail 202 at position above and below the magnetic strip 305.

Figure 8:
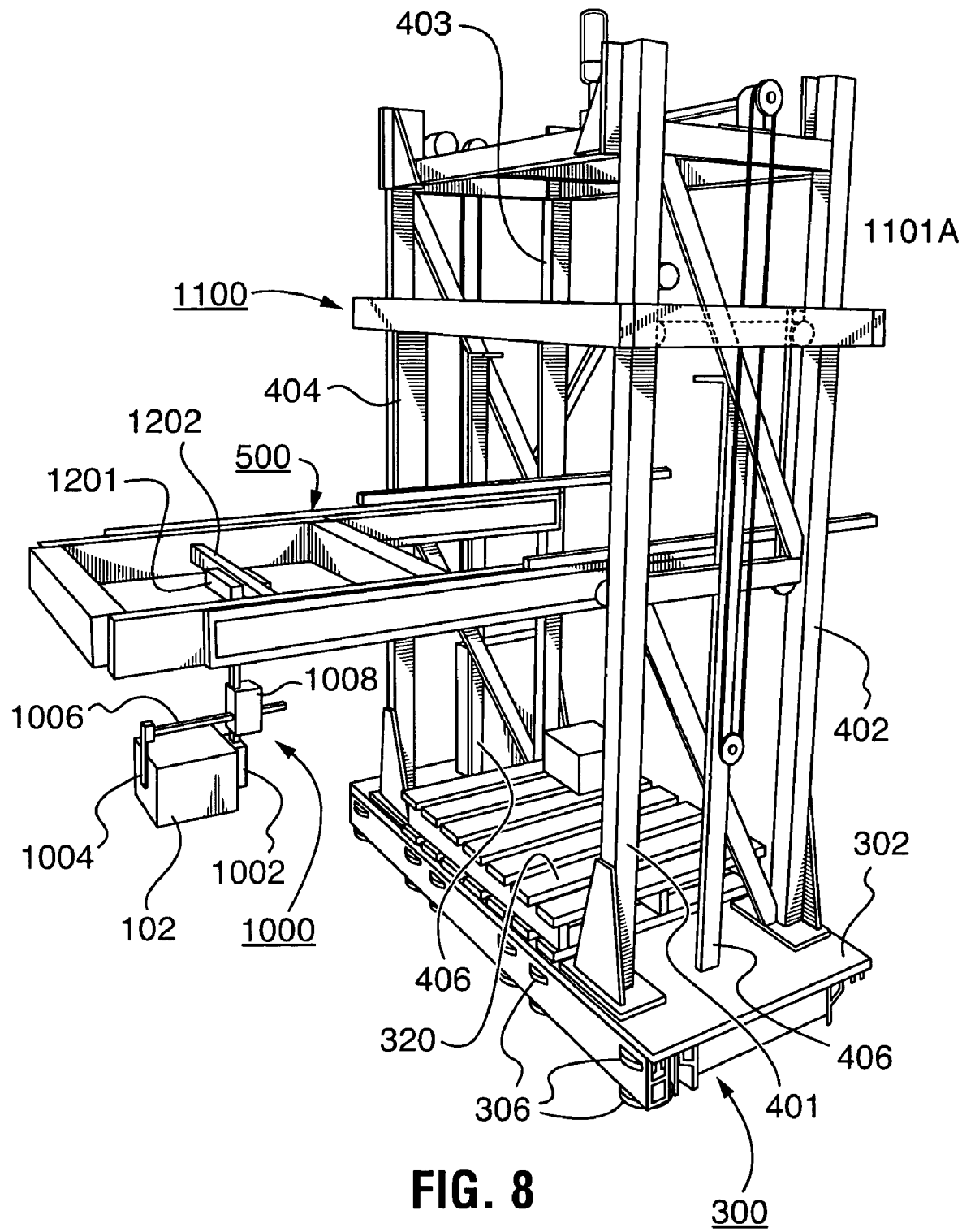
FIG. 8 is an oblique view of the apparatus of FIG. 7 with an article grasped by the jaws of the tool head and a pallet on the rollers on the carriage on which the payload is built.
Figure 9:
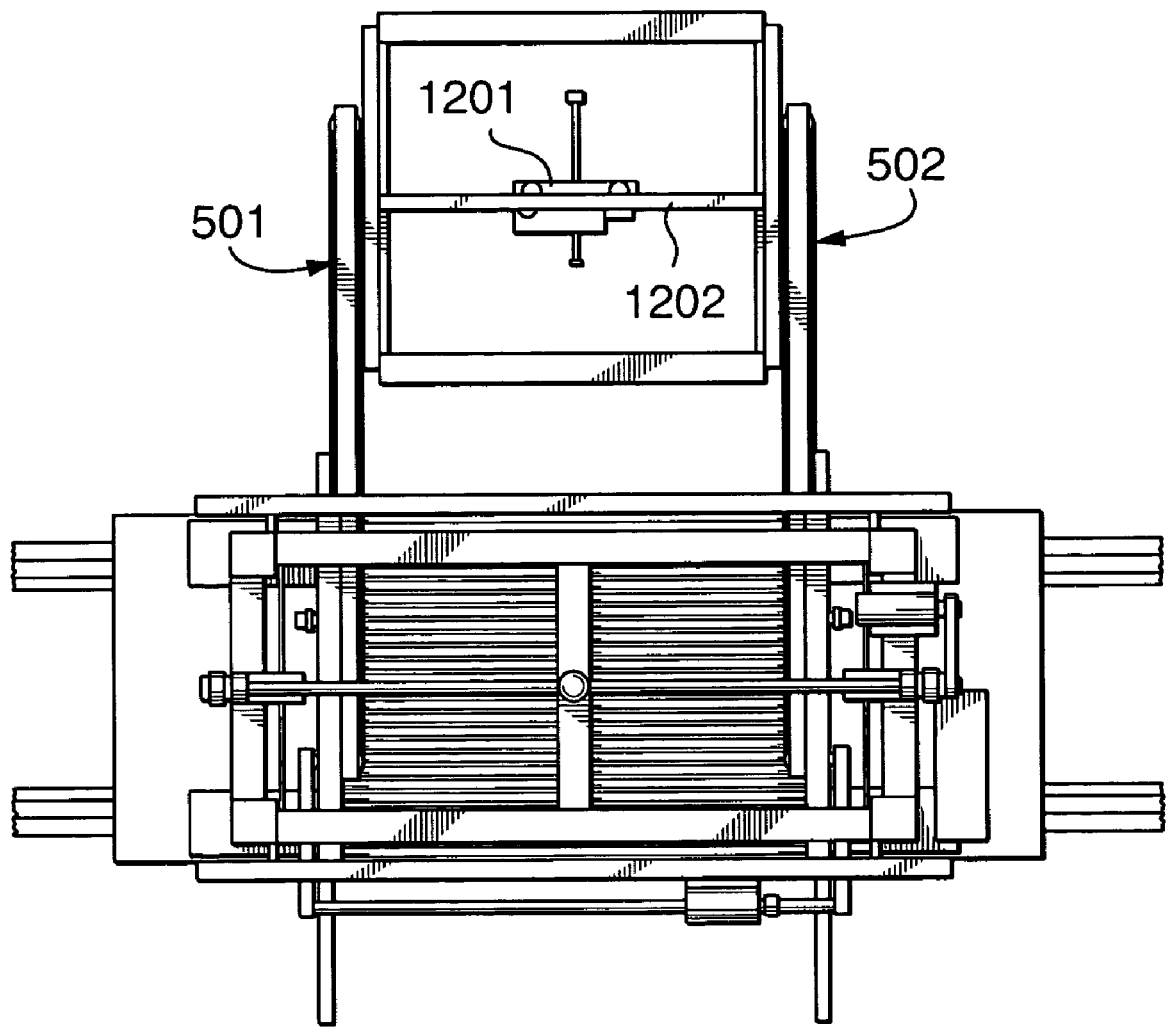
FIG. 9 is a top plan view of the reach unit in an extended position and having the tool unit of FIG. 7 mounted thereon.
Figure 10:
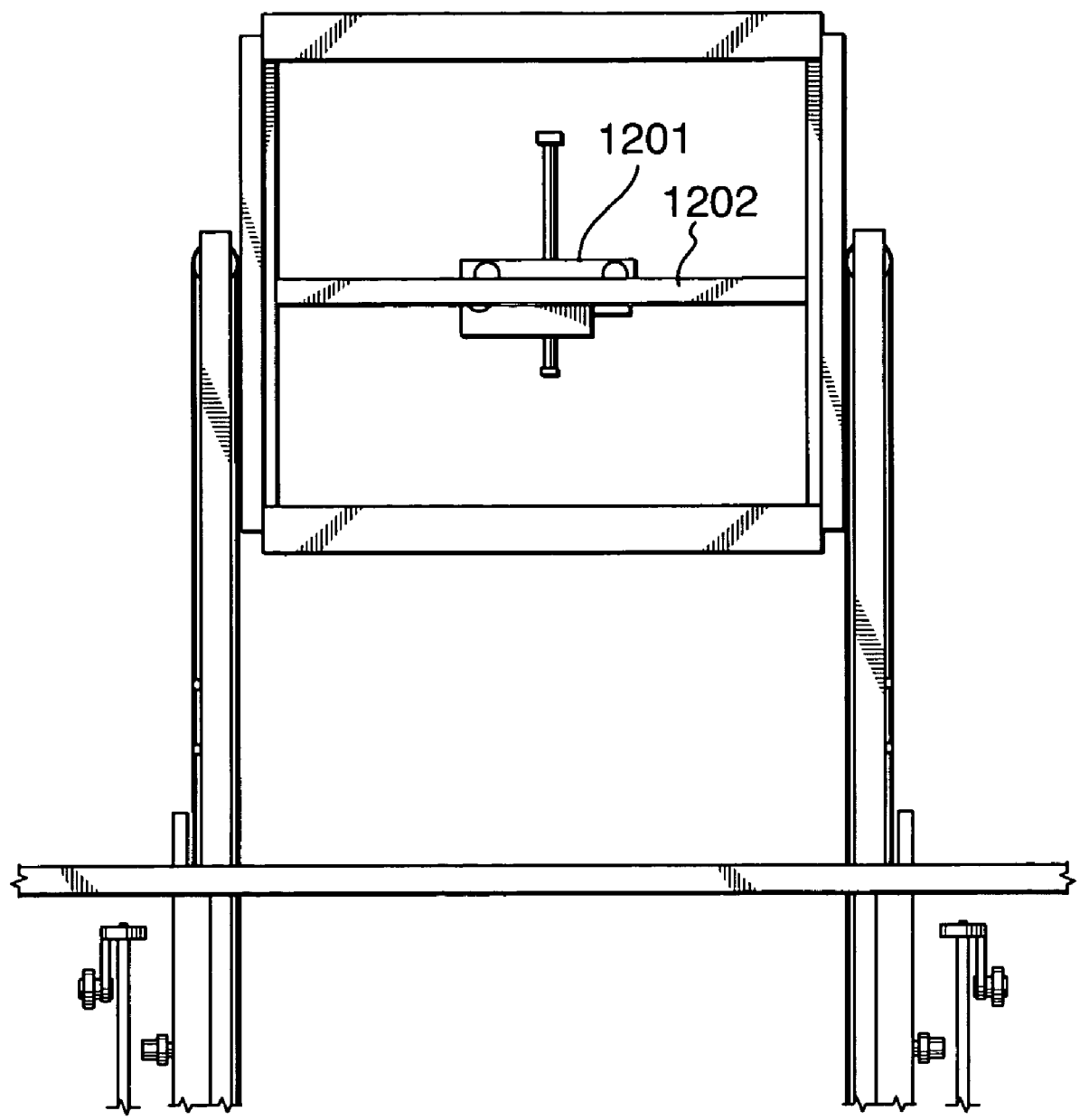
FIG. 10 is a plan view of the extended reach unit shown in FIG. 9 but on a larger scale.

A plurality of side-by-side parallel rollers 310 (parallel to the path designated x-x) are mounted on the carriage and disposed above the carriage plate 302 for loading and unloading articles onto and off the carriage. The rollers are power driven and reversible so as to move goods thereon in one direction or the other as maybe desired for the installation at hand. A quantity of goods are normally loaded, as the load is being built, onto a conventional pallet 320 (see FIG. 8) in situations where the load is suitable for palletizing. Illustrated therein by way of example is an article 101 that has been placed on the pallet and another article 102 in the grasped of a case picker tool unit 1000. The articles, for example each being a case of soft drinks, would have been picked from the storage area 100 by extension of the reach unit 500 (or extension of a boom 1450 illustrated in FIGS. 15 to 19 and described in detail hereinafter) after the carriage had been propelled along the track to the various locations where the articles were located. In FIG. 8 the reach unit is illustrated in a partially retracted position after having picked up a single case from a stack of such cases (in most circumstances on a pallet) in the storage area 100.

The superstructure 400 is carried by the carriage 300 and includes four upright corner posts 401, 402, 403 and 404 having base plates on the lower end thereof that are fixed to the carriage plate 302. Cross-braces 405 suitably rigidify the structure. The upper ends of the posts are interconnected by a frame structure 410 on which is mounted a drive system to be described hereinafter. Intermediate the corner posts 401, 402 there is a vertical rail post 406 and between the corner posts 403, 404 on the opposite side there is a similar vertical rail post (see FIG. 3).

The reach unit 500 is movably mounted for movement up and down on the superstructure 400 by a reach unit mounting cage like structure 1100. The reach unit includes power means to extend the same a selected distance beyond at least one side (preferably both sides) of the superstructure 400 and a further power means raises and lowers the reach unit mounting structure 1100 on the superstructure 400.

The reach unit mounting structure 1100 is cage like unit with respective upper and lower horizontal beams 1101, 1102 interconnected by vertical struts 1103, 1104. Vertically spaced apart respective upper and lower rollers 1105, 1106 rollingly engage the upright corner posts 401, 402, 403 and 404 and thereby guide the structure 1100 during reciprocal up and down movement of the same on the rigid superstructure 400.

The structure 1100 has a plurality of spaced apart rollers 1110, 1112 journalled on each of opposite sides of a lower end portion of the cage. These rollers provide mounting means for the reach unit as will become more apparent hereinafter in a detailed description with reference to FIGS. 2 and 4A. The rollers include at each of respective opposite sides of the frame 1100 an upper horizontally spaced apart pair of rollers 1110 and a lower spaced apart pair 1112.

Figure 5:
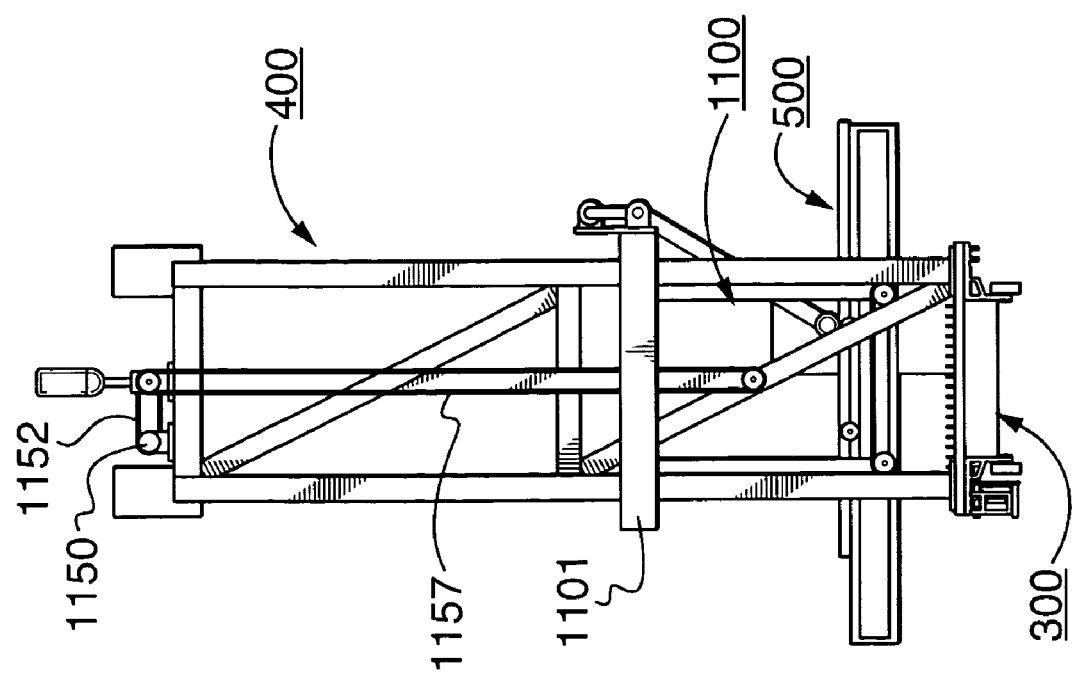
FIG. 5 is a diagrammatic end view of the superstructure as in FIG. 2, but from the opposite end as in FIG. 1 with the reach unit in it's lower at home rest position.
Figure 7:
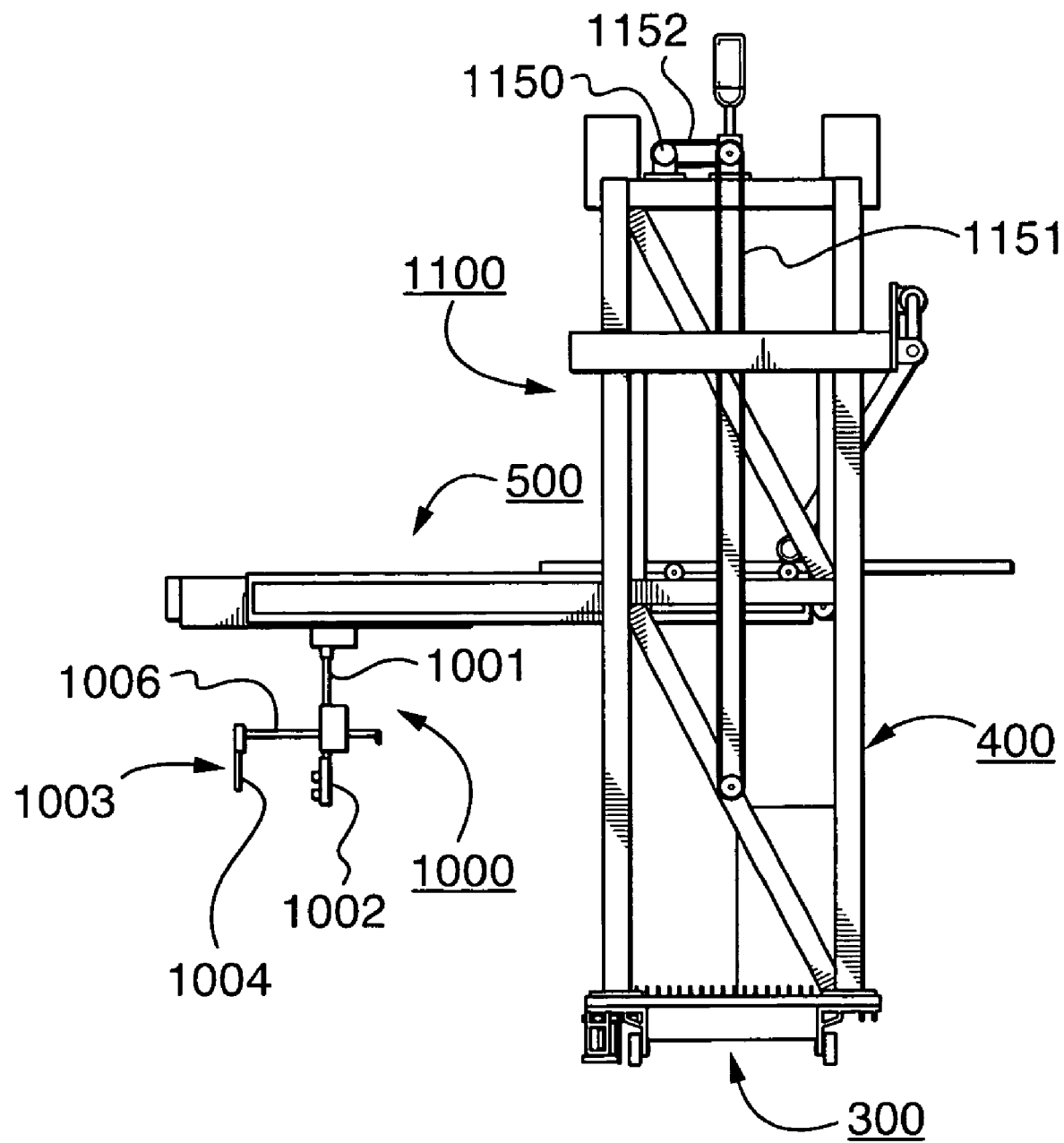
FIG. 7 is an end elevational view similar to FIGS. 5 and 6 with the reach unit partially extended from the other side and with a tool unit mounted on the reach unit for grasping an object.

The reach unit has a pair of horizontally spaced apart telescopic members 501, 502 that are slidably mounted by the rollers 1110, 1112 on the structure 1100. The telescopic members act in unison extending beyond one side or the other of opposite sides of the rigid superstructure 400. The reach unit has a home position (see FIG. 5 ) wherein it extends a selected amount beyond each of said opposite sides of the superstructure.

The frame 1100 as previously described is vertically moveable on the rigid superstructure 400 and the reach unit 500 is mounted on the lower end of the frame 1100. Referring to FIGS. 2, 3, 4, and 4A rollers 1110, 1112 are in rolling engagement with respectively the upper and lower longitudinal faces of a horizontally disposed bar rail 510. Each roller 1110 is journalled on a pivot post 1110A that is securely mounted on the structure 1100. Similarly each roller 1112 is journalled on a pivot post 1112A that is securely mounted on the structure 1100.

The telescopic member 501 is shown in cross-section in FIG. 4A and comprises a channel shape rail 520 and a box beam 530. The bar rail 510 is securely fastened to the web of the channel shaped rail 520. A further upper pair of rollers 506 and a lower pair 507 rollingly engage respectively the same upper and lower faces of the bar rail 510. The rollers 506, 507 are journalled on a plate 508 via respective pivot posts 506A, 507A. An upper and lower respective pairs of roller 509, 509A are journalled on the opposite side of the plate via pivot posts not shown. The rollers 509, 509A each have a "V" notch peripheral surface that rollingly engage opposite "V" shaped vertically disposed longitudinal edges 406A of the vertical rail post 406 of the superstructure 400. The rollers of the upper pair 509 are horizontally spaced apart engaging the opposite edges 406A and the rollers of the lower pair 509A similarly rollingly engage the same respective edges at a position below the rollers 509.

The longitudinal reach unit box beam 530 has upper and lower respective pairs of rollers 535, 536 rollingly engaging the inner surfaces of the respective upper and lower flanges 520A, 520B of the rail 520. The rollers 535, 536 are journalled on respective pivot posts 535A, 536A that are securely mounted on the web of the channel member 520.

The rail 520 and box beam 530 are telescopically moveable on the reach unit support structure via the upper and lower respective pairs of rollers 1110, 1112. Lateral support for the joined together rail 520 and bar rail 510 (a rigid unit) is provided by rollers 526, 527 engaging respectively an outer face of the rail 510 and an inner face of the web of the rail 520. Roller 526 is journalled on a pivot post 526A that is securely mounted on the structure 1100. Roller 527 is journalled on a post 528 secured to and projecting from the box beam 530.

With reference to FIG. 4A rollers 506, 507 have respective pivot axes 506B and 507B and roller 526 has pivot axis 526C disposed perpendicular thereto. Rollers 1110, 1112 have pivot axes (not shown) that are parallel to the pivot axes 506B, 507B and which are parallel to pivot axes 535B, 536B of respective rollers 535, 536.

There are two power systems on the unit 1100 one on which raises and lowers the unit 1100 on the superstructure 400 and the other extends and retracts the reach unit. For raising and lowering the unit 1100 the power system includes a motor 1150 drivingly connected by a belt 1152 to a drive shaft 1151 through a speed reduction unit. The shaft is mounted by journals 1153 on the support frame top structure 410. The shaft extends across the length, i.e. x-x direction, of the frame structure and has pulleys 1154, 1155 on respective opposite ends thereof. The drive is the same at each of opposite ends providing a dual drive. As the two are the same only one will be described. Referring to FIGS. 2, 3, 4, 4A there is a pulley 1156 mounted on the frame structure 400. A belt 1157 with transverse ribs on the drive surface thereof is looped around the pulleys 1154, 1156. One free span of the belt has the ribs thereof clampingly engaging a ribbed plate 1158 secured to one of the frame structure upper beams 1101. The drive motor is reversible and provides means to controllably raise or lower the unit 1100 as required for the operation at hand.

The second power system extends and retracts the reach unit and includes a motor 550 mounted on the upper frame member 1101 of the unit 1100 and is drivingly connected to a shaft 551 by a belt 552. The shaft via respective belts 553, 554 drive a gear 555 near each of opposite ends of the reach unit. The gears mesh with a rack 556 secured to a respective one of the pair of channel beams 520. With the motor being reversible the beam can be controllably reciprocated back and forth on the unit 1100. To move the box beam 530 there are a pair of roller chains 560, 561 (see FIG. 4A) anchored at their respective opposite ends to first and second brackets 562, 563 secured to respective members 508 and 530. The free span of roller chain 560 passes around a pulley 565 journalled on one end of the channel beam 520 and the free span of the other chain 561 passes around a pulley 566 journalled on the opposite end of the beam 520. The two beam 520, 530 thus move in inter-related timed relation with beam 530 moving at twice the rate of the beam 520.

Case Picker Tool Unit 1000

The power operated gripping assembly, generically identified by the reference 600, in the situation of being a case picker, comprises a power operated tool unit 1000 that is illustrated in FIGS. 7 to 12. Referring to these Figures the unit 1000 depends from a rail and motor assembly 1200 that attaches to an inner rectangular frame of the reach unit 500.

The unit 1000 includes a vertical elongate member 1001 having a first jaw member 1002 fixedly secured to the lower end thereof and a second jaw member 1003 movably mounted on the elongate member 1001 at a location above the first jaw member. In the particular embodiment illustrated the vertical elongate member 1001 comprises a pair of spaced apart parallel shafts 1001A, 1001B interconnected at the upper end by a head piece 1001C and at the other end by the first jaw member 1002.

The second jaw member comprises a plate like member 1004 (thickness for example ¼ inch) attached to and depending from a second elongate member 1006. The plate 1004 has an article engaging face 1005. The second elongate member 1006 is disposed perpendicular to member 1001 and is mounted thereon by a block assembly 1008. The block assembly has a motor 1010 mounted thereon for driving the block up and down the first elongate member sufficiently as to permit having the jaw member 1002 in engagement with a side face of an article to be grasped, i.e a case of soft drinks, while at the same time have the other jaw member 1003 offset therefrom at a selected minimum elevation higher than that of the top of such case.

The jaw member 1002 has an article engaging face 1011 with one or more soft lipped orifices 1012 thereon which can be connected to a suitable vacuum source. The purpose, as will be become more apparent hereinafter, is to grip one exposed side face of one article and with that suction grip pull the article away a short distance from an adjacent article so that the jaw member 1003 can be lowered between the two adjacent articles to engage a face of the article opposite the face engaged by the other jaw member. In some instances a suction cup with a suction release valve could be used to accomplish the same result as applying a vacuum to the orifices 1012 The elongate member 1001 is suspended from a gripper rotor 1013 by a shaft 1014 driven by a motor 1015 and gear train 1016, or the equivalent, such as to enable oscillating the jaw assembly through an arc of at least 180 degrees.

The gripper rotor 1013 is secured to and depends from a carriage 1201 which is rollingly supported on an elongate rail 1202. The rail attaches at the opposite ends thereof to the rectangular inner frame of the reach unit 500 (see FIGS. 8-10). A linear magnetic motor that includes a motor 1203 on the carriage and strip of magnets 1204 on the rail provides means for propelling the jaw assembly back and forth on the horizontally disposed rail. Rollers 1205 (four shown in the drawing) engage a side face of the rail 1202 at positions above and below the magnetic strip 1204 and maintain a selected minimum air gap between the motor 1203 and the magnetic strip 1204.

While the unit 1000 is described and illustrated herein for a specific purpose the unit will find use in many other applications.

Layer Picker Tool-Unit 800 and Tool Mounting Frame 900

Figure 13:
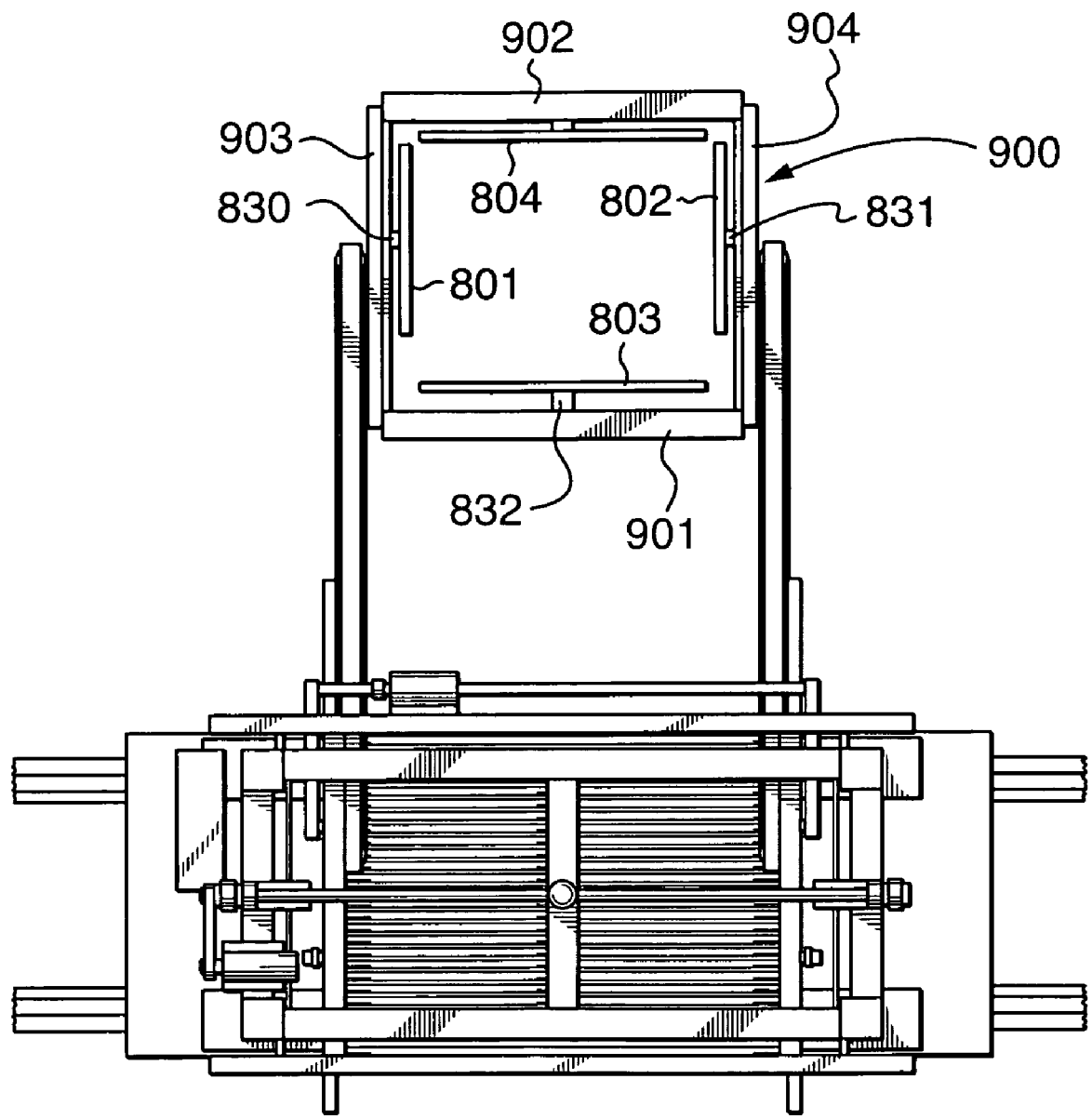
FIG. 13 is a top plan view of a layer picker tool unit mounted on the reach unit and showing the reach unit in an extended position.
Figure 14:
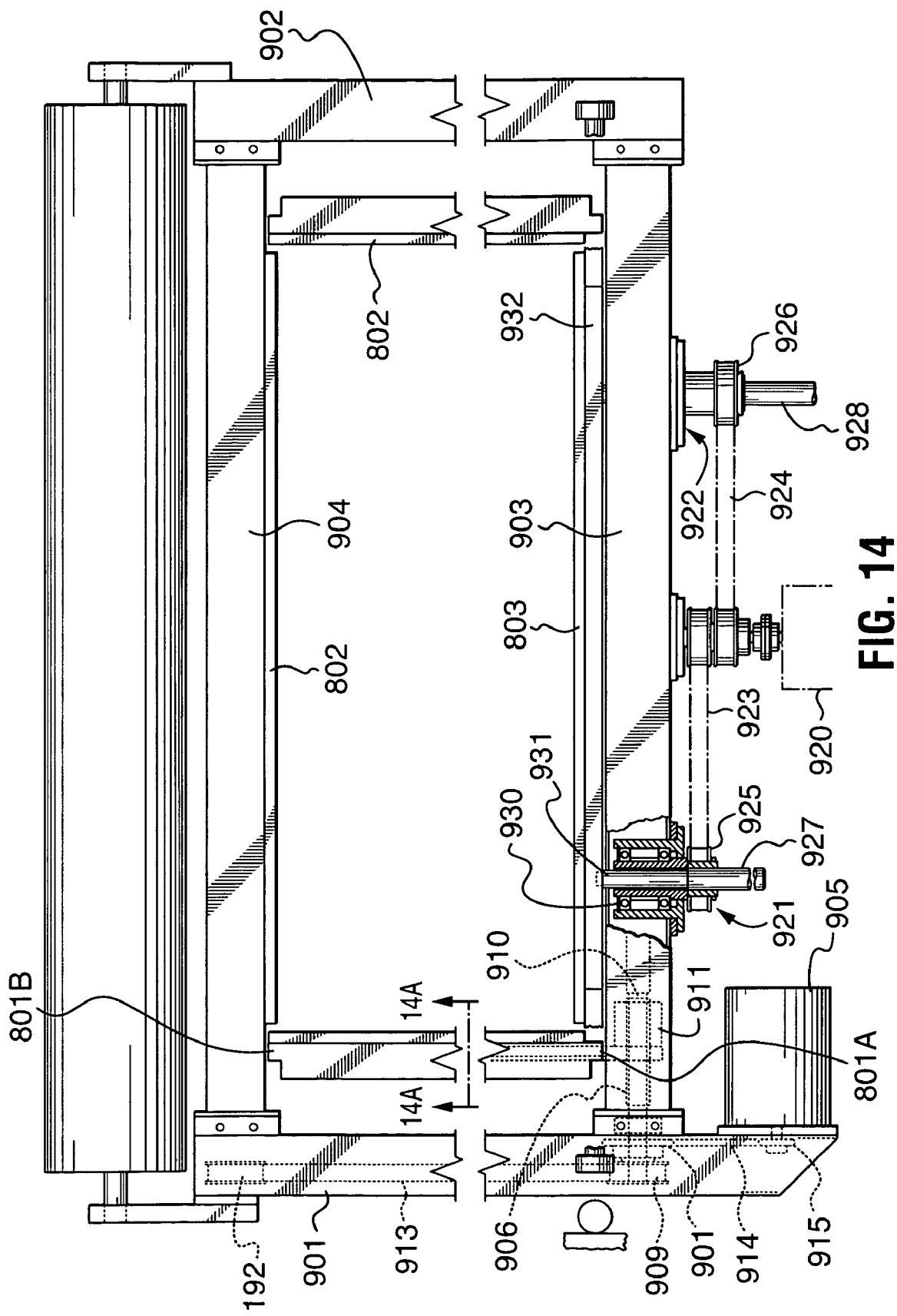
FIG. 14 is a top plan view showing more detail of the layer picker tool unit.
Figure 20:
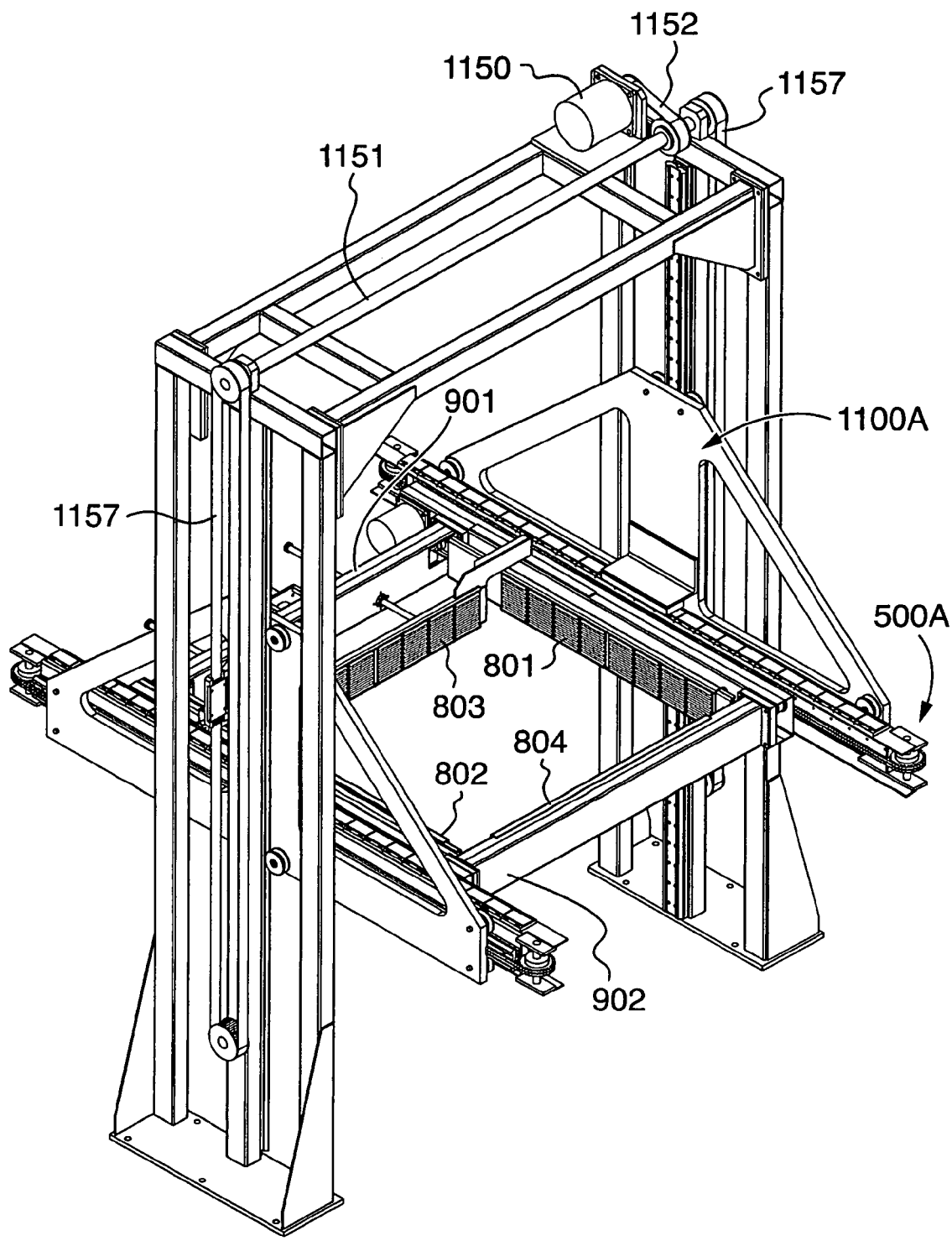
FIG. 20 is an oblique view of a layer picker assembly.
Figure 22:
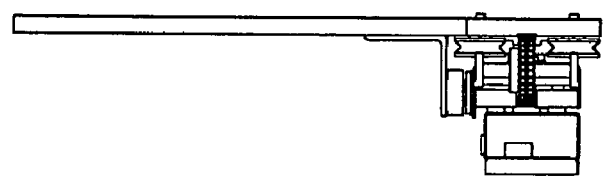
FIG. 22 is a side view of the extender mechanism of FIG. 21.
Figure 21:
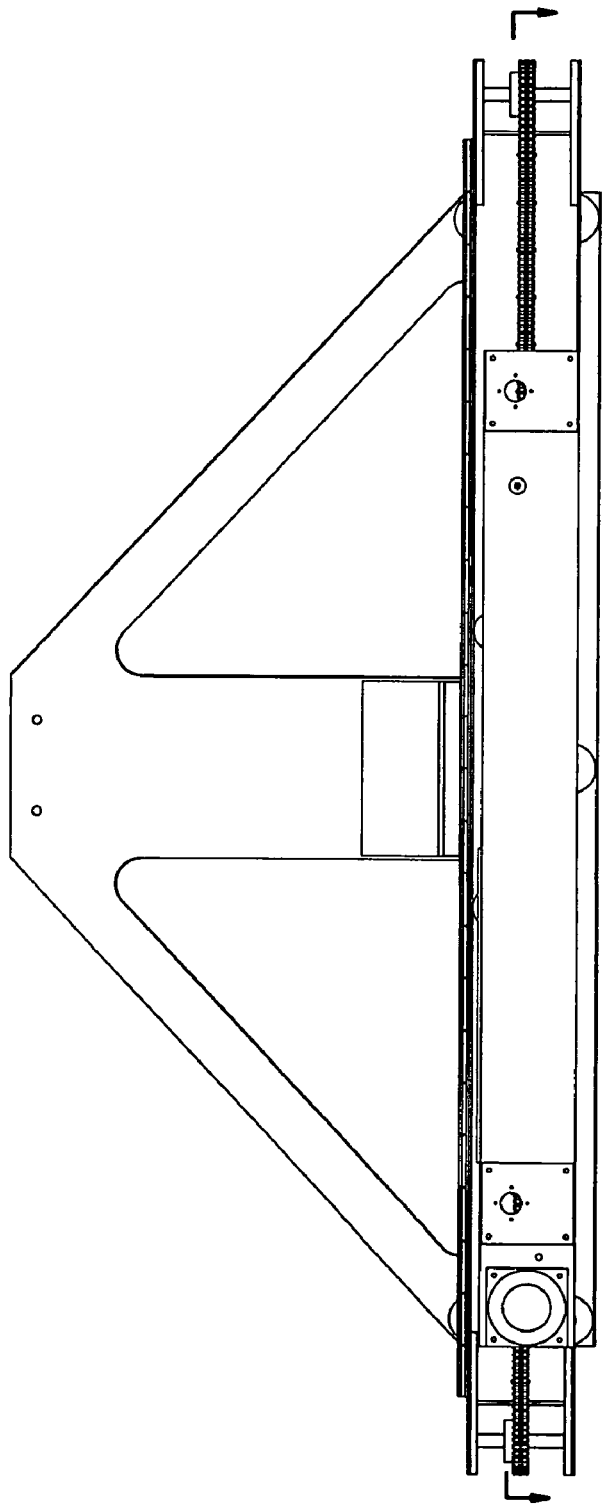
FIG. 21 is a side view of the extender mechanism of the layer picker of FIG. 20.
Figure 23:
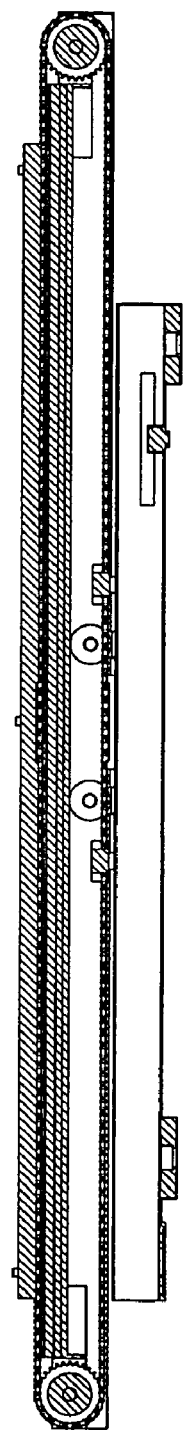
FIG. 23 is a cutaway top view of the chain section of the extender mechanism of FIG. 21.
Figure 26:
FIG. 26 is an end view of the clamp mechanism of FIG. 24.
Figure 24:
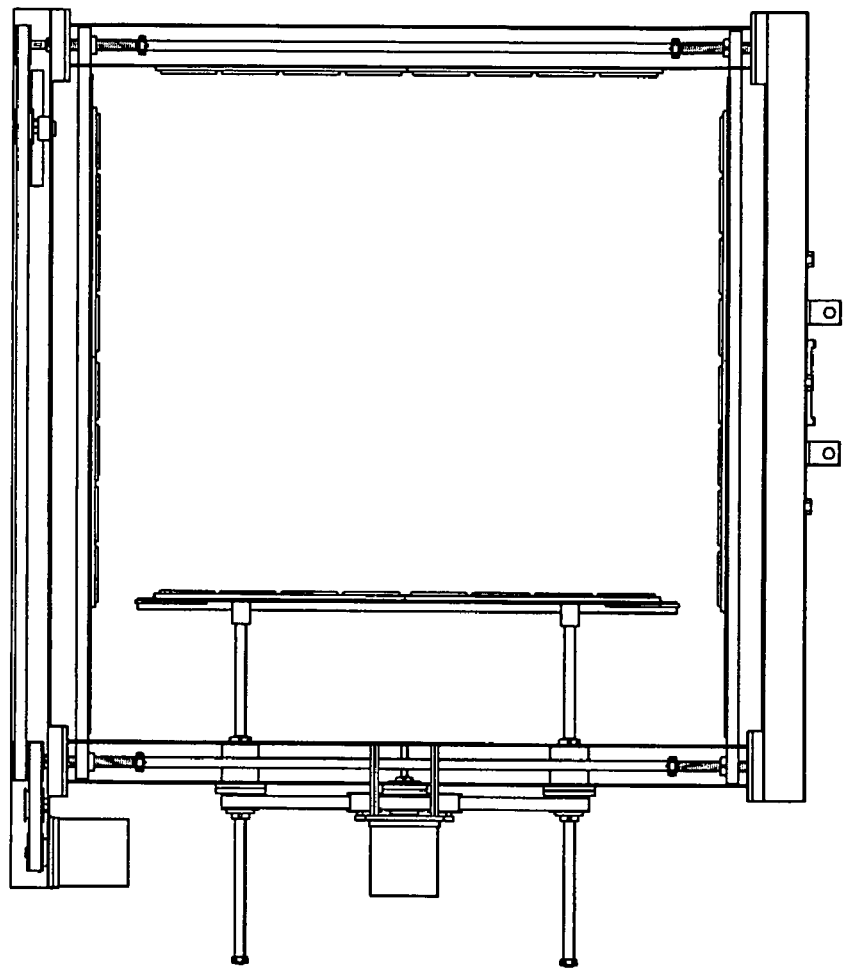
FIG. 24 is a top view of a clamp mechanism of the layer picker assembly of FIG. 20.
Figure 25:
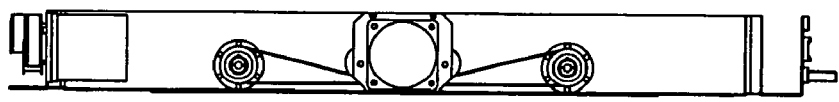
FIG. 25 is a side view of the chain mechanism of the clamp mechanism of FIG. 24.
Figure 27:
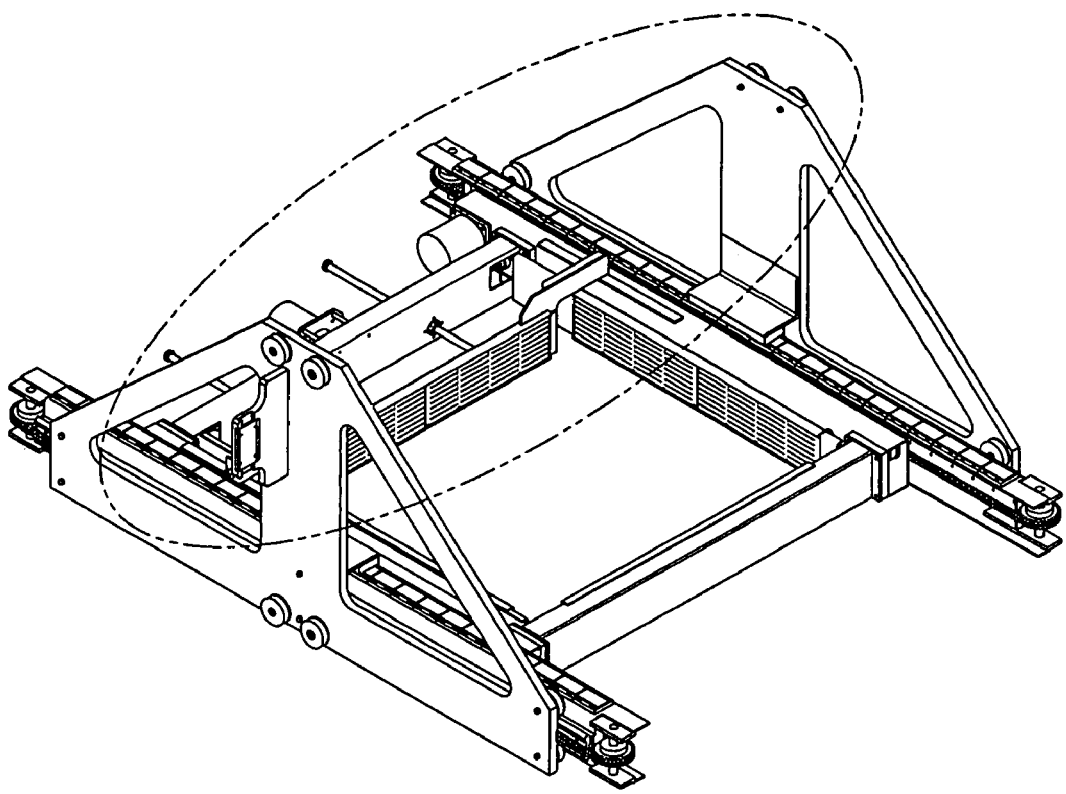
FIG. 27 is a oblique view of a layer picker elevator.
Figure 28:
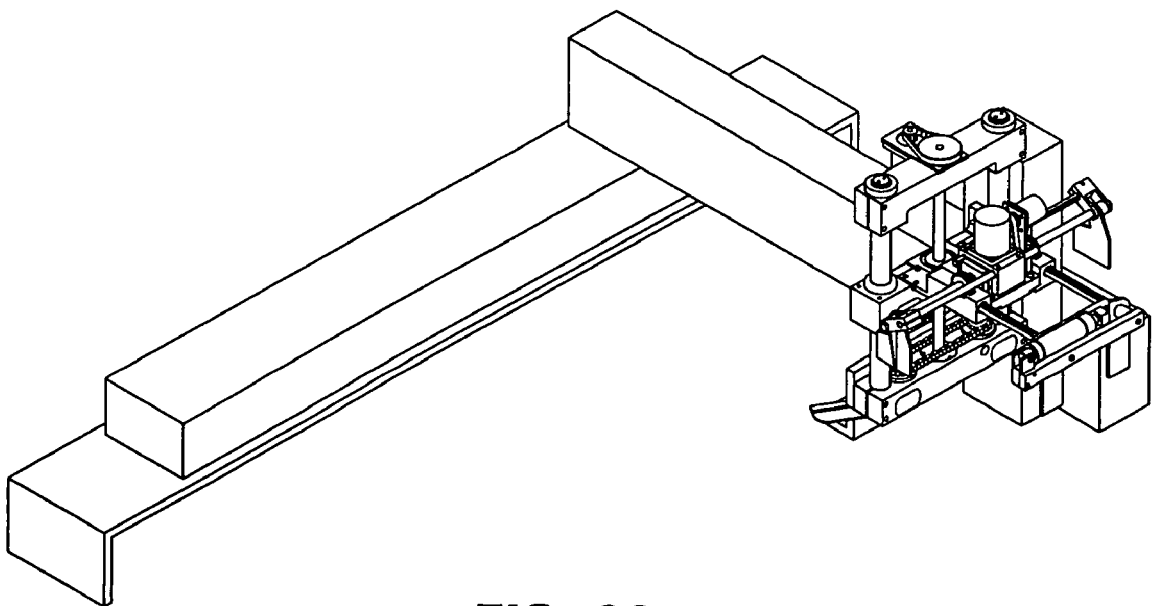
FIG. 28 is an oblique view of a case picker.
Figure 32:
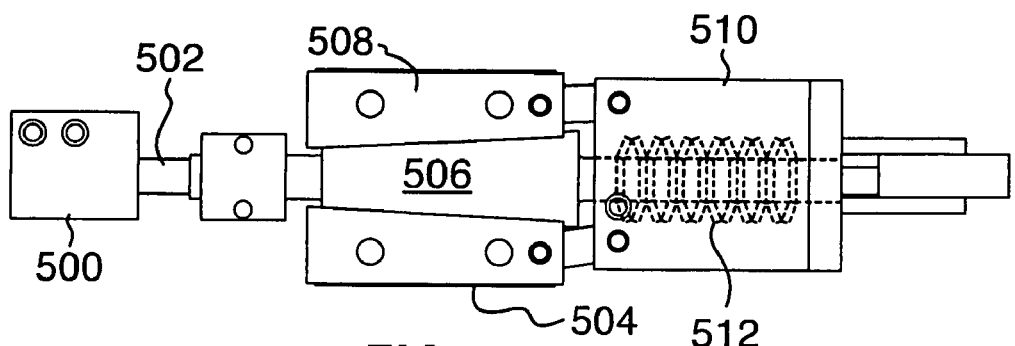
FIG. 32 is a side view of a brake assembly.
Figure 33:
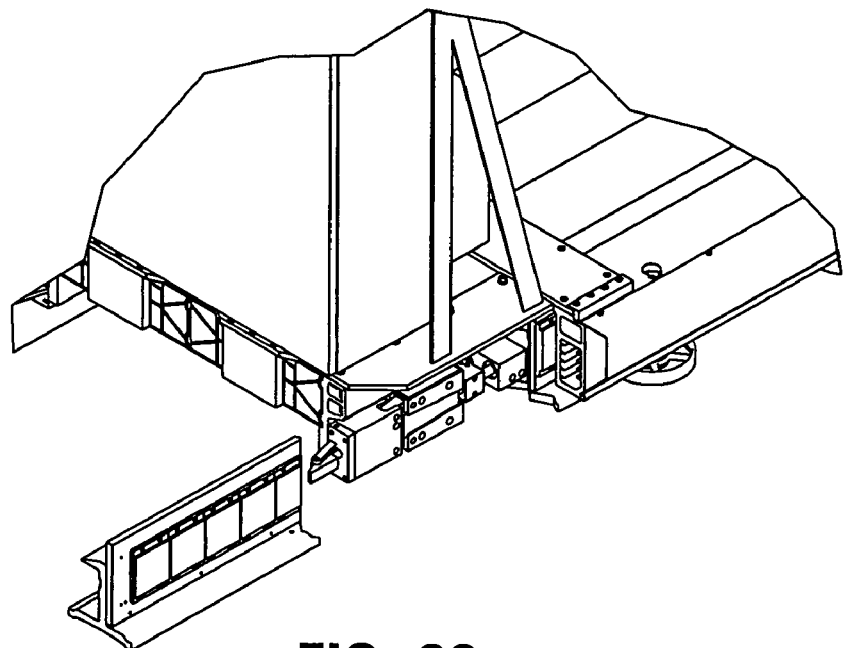
FIG. 33 is a oblique view of the brake assembly mounted on the carrier or linear transfer vehicle.
Figure 34:
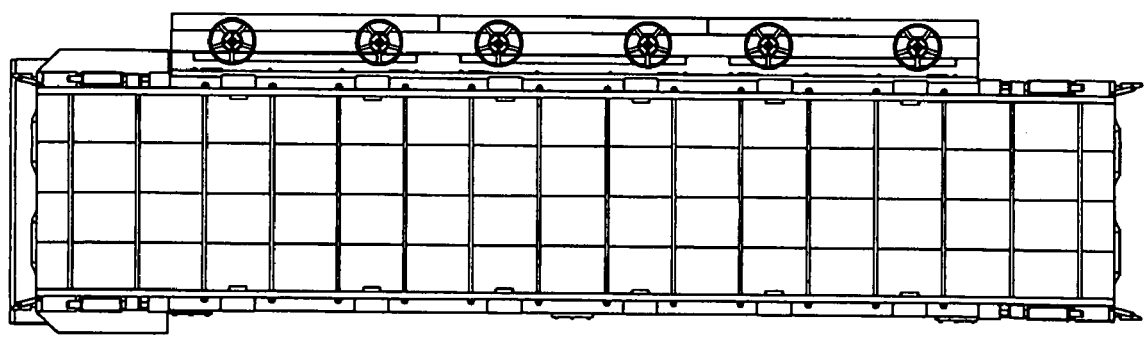
FIG. 34 is a top view of the brake assembly mounted on the carrier or linear transfer vehicle.

The layer picker unit is illustrated in FIGS. 13 and 14. Referring to these drawings the article gripping assembly for retrieving one or more layers from a stack of such articles comprises a variable in size peripheral frame 800 mounted on a rigid frame structure 900 that surrounds the frame 800. A layer may consist of a single article or a plurality of articles in side-by-side relation and having the same footprint as the single article.

The frame 800 comprises opposed parallel spaced apart end members 801 and 802 moveable in a direction toward and away from one another and side member 803, 804 perpendicular thereto. The side member 803 is movable toward and away from the member 804 which is fixed to the frame 900.

The rigid frame structure 900, which mounts on the reach unit 500, is an open frame surrounding the frame 800 and includes elongate opposite side members 901, 902, opposite end members 903, 904, a first drive system for moving members 801 and 802 in directions toward and away from one another and a second drive system for moving member 803 toward and away from member 804.

The first drive system includes a motor 905 mounted on a portion of member 903 that projects beyond the frame side member 901. A shaft 906 is Journalled by bearing means 907 on the frame member 901 and has a sprocket 908 secured thereto as well as a pulley 909. The shaft 906 has right hand threads 910 along a portion thereof and which mate with internal threads in a block member 911. A threaded shaft(not shown) like shaft 906 is journalled on the frame member 902 and has a pulley 912 secured thereto. A drive belt 913 is looped around pulleys 909, 912 for driving the shafts in synchronized relation.

The member 801 has extending portions 801A, 801B projecting from respective opposite ends thereof. The portion 801A is attached to the block member 911 and the projecting portion 801B likewise is attached to a threaded block member at the opposite that mates with threads on the shaft at that end. The belt 912 rotates the shafts in unison causing the member 801 to move in a direction dependent upon the direction of rotation of the shafts. The shaft 906 is driven by the motor 905 via a link chain 914 meshing with sprockets 908 and 915.

The second drive system mounted on the frame 900 that moves the member 803 includes a second motor 920 drivingly connected to respective drive units 921, 922 by drive belts 923, 924 The belts are looped around pulleys on the motor shaft and pulleys 925,926 on respective shafts 927,928 of drive units 921, 922. The drive units 921, 924 are identical with only one being illustrated in detail in the drawings and wherein the shaft 927 is Journalled on the frame member 901 by a bearing 930. Shaft 928 is mounted in the same manner by another bearing 927. The shafts are threadingly connected to respective members 931, 932 fixedly secured to and projecting from the member 803 such that rotation of the shafts 927, 928 will cause the member 803 to move in a direction toward or away from the member 804 dependent upon the direction of rotation of the shafts.

The article gripping members 801, 802, 803 can be reciprocally mounted on the adjacent frame member by multiple posts as described in the foregoing or alternatively by a single post 830 as diagrammatically illustrated in FIG. 13. Also the article engaging surface of the gripping members can be curve to conform to that of preselected articles to be handled.

Referring to FIG. 14A there is illustrated in cross-section the construction of the article gripping member 801 and includes a channel shaped rigid member 850 with a removable cap piece 851. The cap piece has a resilient article engaging member 852 retained thereon by a frame piece 853. The resilient member 852 has a cavity 854 filled with a gel substance and thereby evenly distributes loading as well as conforms to variations in the surface of the article being engaged thereby.

Variations to Case Picker Tool, Tool Mounting and Combination Thereof

In FIGS. 7 to 12 there is illustrated a jaw type tool head mounted on the carriage reach 500. In FIGS. 15 to 19 there is illustrated various modifications to the design of the jaw type tool head as well variations in the mounting thereof on the carriage 300.

Referring to FIGS. 15 to 18 there is illustrated an article handling unit 1400 that includes a tool head 1410 mounted on the free outer end of a telescopic boom 1450 that is attached by a universal joint 1460 to a mono rail carriage 1470 or other suitable support.

The tool head 1410 includes a first jaw member 1420 secured to and depending downwardly from an elongate frame 1421 on which is mounted a second jaw member 1430 for movement relative to the first jaw member. The elongate frame comprises two generally parallel space apart members 1422 at least one of which is a conduit for supplying a vacuum from a suitable source to a plurality of suction cups 1423 on the face of the jaw member 1420. In FIG. 17 the vacuum source inlet is designated 1425. The suction cups 1423 each have a vacuum release valve 1426 for controllably releasing a vacuum grip on a side face of an object to be moved from an adjacent object enabling placing the second jaw member between the two objects whereby the object can be grasped between the two jaw members.

A cross head piece 1427 is slidably mounted on the members 1422 and reciprocally mounted thereon is a pair of rods 1431 from which depends a plate 1432. A motor 1433 is mounted on the cross head piece 1427 and reciprocally moves the rods 1431 in the direction of the double headed arrow A and the cross head on the members 1422 in the direction of the double headed arrow B.

The tool head 1410 pivotally attached to a yoke 1451 on the free outer end of the telescopic boom by a pivot pin 1452. Robotic gear head rotator 1453 controllably oscillates the too head 1410 through a selected arc (for example 60 degrees ) indicated by a double headed arrow C.

The telescopic boom 1450 includes respective inner and outer boom sections 1454, 1455. The inner section is rollingly guided in the boom section by a plurality of rollers 1456 each of which has a "V" shape peripheral surface mating with correspondingly shaped longitudinal edges on the inner boom section. The inner boom section is extended and retracted relative to the outer boom section by a motor 1457 and drive belt 1458 that has ribs extending across the inner drive surface thereof. The belt is looped around a pulley 1459 journalled on the outer boom section 1455 and a free span of the belt is clampingly engaged between a block unit 1454A secured to the boom section 1454. The outer boom section 1455 has a slot in the upper surface thereof for the block to reciprocate back and forth The universal joint 1460 comprises respective first and second robotic gear head rotators 1461, 1462 pivotally interconnected for movement relative to one another about a pivotal interconnection 1463. The unit 1462 is securely fixed to the outer boom section 1455 and the unit 1461 is pivotally attached to the carriage 1470 for movement about an axis disposed perpendicular to the axis of pivot 1463.

The foregoing assembly 1400 can be variously mounted on the carriage superstructure 400. In one embodiment the carriage 1470 can be carried by the mono rail 1202 diagrammatically illustrated in FIGS. 8, 9, and 10. If desired the monorail can be disposed perpendicular to that shown in these Figures. In another embodiment the monorail 1202 can be mounted on for example the upper frame 1101 of the cage like structure 1100. In such an installation the rail preferably would be so orientated that the rail carriage would travel in the y-y direction i.e. perpendicular to the direction of travel of the carriage on the track. In this embodiment the reach unit 500 is not required and can be eliminated as the boom and mounting there of on the rail carriage provides sufficient reach and movement for retrieving objects from the storage area.

Control System 700

Power is supplied to the components by way of a multichannel cable that can be anchored to the mobile carriage and connect to the components for supplying power thereto from a suitable source. The motors powering the various components have actuators that can be actuated from a remote location by signals sent via the conductors of the multichannel cable or sent by wireless means or combinations thereof. Positional accuracy and control of the carriage can be accomplished by a linear encoding system.

Movement of the platform is accomplished by interaction of the linear motors with the magnets based upon the Hall effect, whereby a transverse electric field is developed in a current-carrying conductor placed in a magnetic field. Ordinarily the conductor is positioned so that the magnetic field is perpendicular to the direction of current flow and the electric field is perpendicular to both. The high magnetic attraction between the coil assembly of the linear servo motors and magnet plates is very effective for preloading heavy-duty bearings commonly used in high force applications such as the closed loop servo performance required for the instant invention.

A trough shaped cover 250 is removably mounted on the box beam 203 and provides and accessible channel 251 for power cables and wiring of a control system for the motor.

Means are mounted to and/or in close proximity to at least one of the rails for generating pulses readable by a reader in communication with the control unit. The means comprises an optical or magnetic linear encoder system or other such device typically available from such manufacturers as Renishaw, RSF Electronics, Heidelhein and many others as a "commercial-off-the-shelf" item or other such custom-made units, consisting of a fixed glass scale or tape system with a precise series or pattern of graduated marks, bar codes, colors, shapes, scribes, holes, indentations, magnets or magnetic coding or other such indicators encoded on, mounted on or inscribed in the surface of the tape or scale at regular and/or repeating intervals of a known and fixed period. At least one electronic reader unit is mounted on the platform for reading and/or counting of the indicators encoded on the scale or tape system, as a means of establishing the position of the platform at any point along the length of rail system and controlling the movement of the platform by means of providing real-time feedback of the position or movement to the control unit.

For example in one preferred embodiment, a thin magnetic tape indicator strip extends along the inner surface of at least one of rail includes magnetized graduations which generate pulses readable by the a reader in communication with the control unit for the carrier as it moves along the rails.

It is contemplated that the means in close proximity to the rail for generating pulses readable by a reader in communication with the control unit can be replaced by or complimented with a "range-finding" device or interferometry system. A "range-finding" device or interferometry system can be used to accurately measure or determine distance to or from a fixed position. Typically the device comprises an electronic signal generator, receiver and interpretation device or other such electronic measurement hardware mounted on the moving platform and projecting a laser, infrared, ultrasonic, radar or other such signal onto a known "fixed" target consisting of fixed optics, reflective lens or other such material mounted fixed to a stationary position on the earth. It measures or calculates by means of signal processing or other electronic means a known or relative position of the platform based on the interpretation of the signal received from or reflected by the known fixed target. As the standard means of implementation, the interferometer device can be mounted on the moving platform with the fixed target mounted at one end of the rail system fixed to the earth, but the same results would be generated by the reverse-mounted orientation with a fixed interferometer and moving target and is anticipated as a required implementation for the invention. In either case, the interferometer system would function as a means of establishing the position of the platform at any point along the length of rail system and controlling the movement of the platform by means of providing real-time feedback of the position or movement of the platform to the control unit. Such interferometer or laser encoder systems are typically available from manufacturers such as Renishaw, Sick Optics and others as a "commercial-off-the-shelf" item or can be constructed by combining similar such available components to form a interferometry system of similar operation and function.

Applicant's prior patents describe the user of at least one fail safety brake is attached to the carrier having a brake shoe held in the "on" position by springs to bear against the inside one of more of the rails, wherein the brake shoe is spaced apart from the rail and held in the release "open" position by air pressure supplied to the actuators of the robot, so that failure of the air pressure permits the shoes to contact the guide rail 28 stopping the motion of the platform in case of an emergency.

As depicted in FIGS. 29-31 of the present invention, a brake assembly is utilized with the carriage platform. As shown in FIG. 29 a high pressure nitrogen cylinder or hydraulic cylinder 500 is shown having a rod 502 extending therefrom into a trigger assembly 504 having a solenoid 506 disposed between a part of expanding brake shoes 508. The brakes are held together by springs and expand outward against the bottom and top flanges of the rail. The rod extends from the solenoid into a housing 510 containing a plurality of springs, preferably BELLEVILLE springs 512 which are cup shaped springs having the rod extend therethrough. The solenoid provides a trigger in that it is spring loaded and holds against the spring as long as electrical energy is supplied to it, upon losing power, the solenoid releases and the plunger trips the trigger which allows the springs 512 to exert pressure on the brake shoes 508 expanding them outward contacting the track to stop the carrier. Typically the shoes in the contracted position are spaced only a fraction of an inch from the rail flange surfaces. In one preferred embodiment about 1 to ⅔₂ of an inch.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

The invention claimed is:

1. An apparatus for retrieving articles from various different locations in a preselected area with a quantity of such articles therein and delivering the same to a designated area spaced from said preselected area, said apparatus comprising:
a carriage rollingly mountable on a track system having a predetermined path offset a selected distance along said preselected area for the articles, said carriage having a load carrying support surface thereon for holding articles as they are retrieved in succession one after another from said preselected area and first power means on said carriage to propel the same along said track
a rigid support superstructure carried by said carriage;
reach means mounted on said superstructure and second power means to extend and retract the same, said reach means comprises an extendible and retractable boom, said boom includes a telescopic section;
a power operated article gripping assembly carried by said reach means for grasping an article to be retrieved from said preselected area and place it on said carriage load carrying surface; and
means mounting said boom on said superstructure comprising a pair of interconnected gear head rotators with respective first and second angularly related pivot axes, means mounting one of said rotators on a section of said boom and the other on said superstructure.

2. The apparatus of claim 1 including means to inter-relate and control movement of the carriage along said track, movement of said reach means, operation of the article gripping assembly to retrieve articles one after another from said storage area to accumulate a load on said carriage and deliver such load to said designated area.

3. The apparatus of claim 1 including a mono rail, means mounting said mono rail on said superstructure, a mono rail carriage mounted on said mono rail for movement thereon and wherein said other one of said rotators is secured to said mono rail carriage.

4. The apparatus of claim 3 including power means on said superstructure and drivingly connected to said reciprocally mounted frame structure to raise and lower the same and power means mounted on said reciprocally mounted frame structure and drivingly connected to said reach means to selectively extend and retract the same.

5. Apparatus as defined in claim 3 wherein said reach unit is extendible respectively beyond each of opposite sides of said superstructure.

6. An apparatus for retrieving articles from various different locations in a preselected area with a quantity of such articles therein and delivering the same to a designated area spaced from said preselected area, said apparatus comprising:
a carriage rollingly mountable on a track system having a predetermined path offset a selected distance along said preselected area for the articles, said carriage having a load carrying support surface thereon for holding articles as they are retrieved in succession one after another from said preselected area and first power means on said carriage to propel the same along said track
rigid support superstructure carried by said carriage;
reach means mounted on said superstructure and second power means to extend and retract the same;
a power operated article gripping assembly carried by said reach means for grasping an article to be retrieved from said preselected area and place it on said carriage load carrying surface;
said article gripping assembly comprises:
a base assembly;
a first elongate member mounted on said base assembly, said elongate member extending in a first direction and terminating in a first jaw member on a free outer end thereof, said jaw member having an article engaging face thereon;
a second elongate member movably mounted on said first elongate member for movement longitudinally there along in a direction toward and away from said first jaw member;
said first and second elongate members being angularly related with respect to one another;
a second jaw member mounted on said second elongate member and being moveable in a direction toward and away from said first elongate member; and
power means for moving said second jaw member.

7. Apparatus as defined in claim 6 wherein said elongate members are disposed perpendicular to one another.

8. An apparatus for retrieving articles from various different locations in a preselected area with a quantity of such articles therein and delivering the same to a designated area spaced from said preselected area, said apparatus comprising:
a carriage rollingly mountable on a track system having a predetermined path offset a selected distance along said preselected area for the articles, said carriage having a load carrying support surface thereon for holding articles as they are retrieved in succession one after another from said preselected area and first power means on said carriage to propel the same along said track;
said track system comprising at least two spaced apart rails shaped to capture at least two rows of wheels (supporting said carriage) from above and on an exposed side of said wheels, thereby guiding said carriage in a precise path down said track system;
a rigid support superstructure carried by said carriage;
reach means mounted on said superstructure and second power means to extend and retract the same;
a power operated article gripping means assembly carried by said reach means for grasping an article to be retrieved from said preselected area and place it on said carriage load carrying surface;
said gripping means comprises a variable size peripheral frame for embracing at least one article to be retrieved, said frame containing at least four sides wherein at least three sides contain interior walls capable of moving toward and away from said at least one article to be gripped;
power means connected to said variable in size frame selectively to vary the size of the same for receiving and grasping an article; and
means mounting said variable in size frame on said reach means.

9. The apparatus as defined in claim 8 wherein said reach means comprises a frame structure reach unit reciprocally mounted for vertical up and down movement on said superstructure and an extendible and retractable reach unit reciprocally mounted on said frame structure for extension and retraction in a horizontal direction and wherein said article gripping means is mounted on said reach unit.

10. The apparatus of claim 8 including means to inter-relate and control movement of the carriage along said track, movement of said reach means, operation of the article gripping assembly to retrieve articles one after another from said storage area to accumulate a load on said carriage and deliver such load to said designated area.

11. The apparatus as defined in claim 8 wherein said at least four interior walls are covered with a compressible gripping material.

12. Apparatus for retrieving articles from a stack of the same in a selected storage area and load the same onto a mobile carriage means, said apparatus comprising:
- a support structure;
- an extendable and retractable boom;
- means mounting said boom, adjacent one end thereof, on said support structure;
- a work head tool; and
- means mounting said work head tool on a free outer end of said boom opposite to said one end, said work head tool comprising a yoke attached to said boom and extending from said free outer end thereof, a first elongate member pivotally attached to said yoke, a first jaw member secured to and extending from said first elongate member, a second elongate member disposed at an angle perpendicular to said first elongate member and movably mounted on said first elongate member for movement longitudinally therealong, a second jaw member mounted on a distal end of said second elongate member and being reciprocally movable in directions toward and away from said first elongate member, said second jaw member having an article engaging face positionable in face-to-face relation with said first jaw member.

\* \* \* \* \*